United States Patent
Turyagyenda et al.

(10) Patent No.: US 12,501,497 B2
(45) Date of Patent: Dec. 16, 2025

(54) METHODS, ARCHITECTURES, APPARATUSES AND SYSTEMS DIRECTED TO IMPROVED SERVICE CONTINUITY FOR OUT OF RANGE PROXIMITY WIRELESS TRANSMIT/RECEIVE DEVICES

(71) Applicant: InterDigital Patent Holdings, Inc., Wilmington, DE (US)

(72) Inventors: Charles Turyagyenda, London (GB); Alain Mourad, Staines-Upon-Thames (GB); Ulises Olvera-Hernandez, Saint-Lazare (CA); Jani-Pekka Kainulainen, London (GB); Giovanni Rigazzi, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 559 days.

(21) Appl. No.: 17/796,084

(22) PCT Filed: Jan. 29, 2021

(86) PCT No.: PCT/US2021/015932
§ 371 (c)(1),
(2) Date: Jul. 28, 2022

(87) PCT Pub. No.: WO2021/155311
PCT Pub. Date: Aug. 5, 2021

(65) Prior Publication Data
US 2023/0096462 A1    Mar. 30, 2023

Related U.S. Application Data

(60) Provisional application No. 62/967,505, filed on Jan. 29, 2020.

(51) Int. Cl.
*H04W 76/10* (2018.01)
*H04W 24/08* (2009.01)
(Continued)

(52) U.S. Cl.
CPC ......... *H04W 76/10* (2018.02); *H04W 24/08* (2013.01); *H04W 28/0268* (2013.01); *H04W 76/25* (2018.02); *H04W 92/18* (2013.01)

(58) Field of Classification Search
CPC . H04W 76/10; H04W 24/08; H04W 28/0268; H04W 76/25; H04W 92/18; H04W 76/11; H04W 76/14; H04W 76/23
See application file for complete search history.

(56) References Cited

U.S. PATENT DOCUMENTS

2019/0082495 A1* 3/2019 Kim ............... H04W 76/38
2019/0150219 A1* 5/2019 Wang ............ H04W 36/0033
370/329
(Continued)

FOREIGN PATENT DOCUMENTS

| EP | 3255950 A1 | 12/2017 |
|---|---|---|
| WO | WO 2018006017 A1 | 1/2018 |
| WO | WO 2019195138 A1 | 10/2019 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15); 3GPP TS 36.300 V15.5.0 (Mar. 2019) 363 pages.
(Continued)

*Primary Examiner* — Schquita D Goodwin
(74) *Attorney, Agent, or Firm* — Majid Albassam

(57) ABSTRACT

Procedures, methods, architectures, apparatuses, systems, devices, and computer program products directed to improved service continuity in connection with wireless transmit/receive devices not remaining within proximity/range of each other to continue device-to-device (D2D) communications are provided.

20 Claims, 25 Drawing Sheets

(51) Int. Cl.
*H04W 28/02* (2009.01)
*H04W 76/25* (2018.01)
*H04W 92/18* (2009.01)

(56) References Cited

U.S. PATENT DOCUMENTS

| | | | | |
|---|---|---|---|---|
| 2020/0296696 | A1* | 9/2020 | Goldhamer | H04W 4/40 |
| 2021/0076236 | A1* | 3/2021 | Kimura | H04W 16/18 |
| 2021/0289391 | A1* | 9/2021 | Paladugu | H04W 88/04 |
| 2022/0022228 | A1* | 1/2022 | Wang | H04W 76/14 |
| 2022/0201538 | A1* | 6/2022 | Lee | H04W 28/0268 |
| 2022/0279075 | A1* | 9/2022 | Fan | H04M 15/8033 |
| 2022/0279348 | A1* | 9/2022 | Youn | H04W 12/06 |
| 2022/0286876 | A1* | 9/2022 | Van Phan | H04W 24/04 |
| 2022/0353799 | A1* | 11/2022 | Talebi Fard | H04W 48/16 |
| 2023/0085018 | A1* | 3/2023 | Liu | H04W 76/14 |
| | | | | 370/329 |

OTHER PUBLICATIONS

3rd Generation Partnership Project; Technical Specification Group Core Network and Terminals; Proximity-services (ProSe) User Equipment (UE) to ProSe function protocol aspects; Stage 3 (Release 15); 3GPP TS 24.334 V15.2.0 (Sep. 2018); 264 pages.

3rd Generation Partnership Project; Technical Specification Group Core Network and Terminals; Non-Access-Stratum (NAS) protocol for 5G System (5GS); Stage 3 (Release 16); 3GPP TS 24.501 V16.2.0 (Sep. 2019); 611 pages.

Third Generation Partnership Project, "Technical Specification Group Services and System Aspects; Proximity-based services (ProSe); Stage 2 (Release 15)," 3GPP TS 23.303 V15.1.0 (Jun. 2018); 130 pages.

Third Generation Partnership Project, "Technical Specification Group Services and System Aspects; System Architecture for the 5G System (5GS); Stage 2 (Release 16)," 3GPP TS 23.501 V16.2.0 (Sep. 2019); 391 pages.

3rd Generation Partnership Project;Technical Specification Group Services and System Aspects; Architecture enhancements for 5G System (5GS) to support Vehicle-to-Everything (V2X) services (Release 16); 3GPP TS 23.287 V16.0.0 (Sep. 2019); 49 pages.

Third Generation Partnership Project, "Technical Specification Group Services and System Aspects; Procedures for the 5G System (5GS); Stage 2 (Release 16)," 3GPP TS 23.502 V16.2.0 (Sep. 2019); 525 pages.

* cited by examiner

User Plane for PC5 interface

Example Discovery Plane PC5 Interface

Example PC5 Signalling Protocol

Example PC5 Unicast Links

Example Per-Flow PC5 QoS Model for PC5

| 8 | 7 | 6 | 5 | 4 | 3 | 2 | 1 | |
|---|---|---|---|---|---|---|---|---|
| | | | NAS message container IEI ||||| octet 1 |
| | | | Length of NAS message container contents ||||| octet 2 |
| | | | |||||octet 3 |
| | | | |||||octet 4 |
| | | | NAS message container contents ||||| |
| | | | |||||octet n |

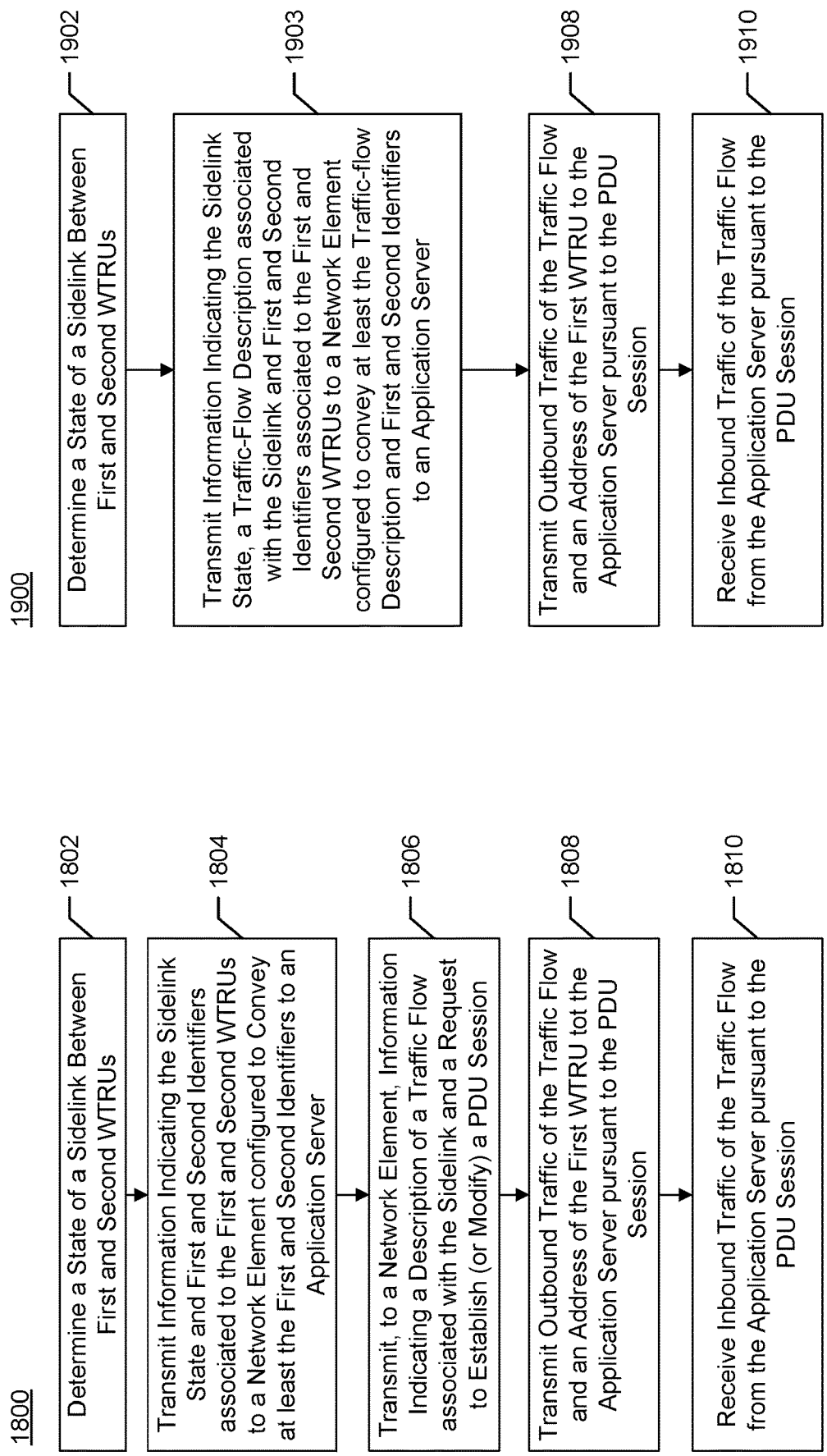

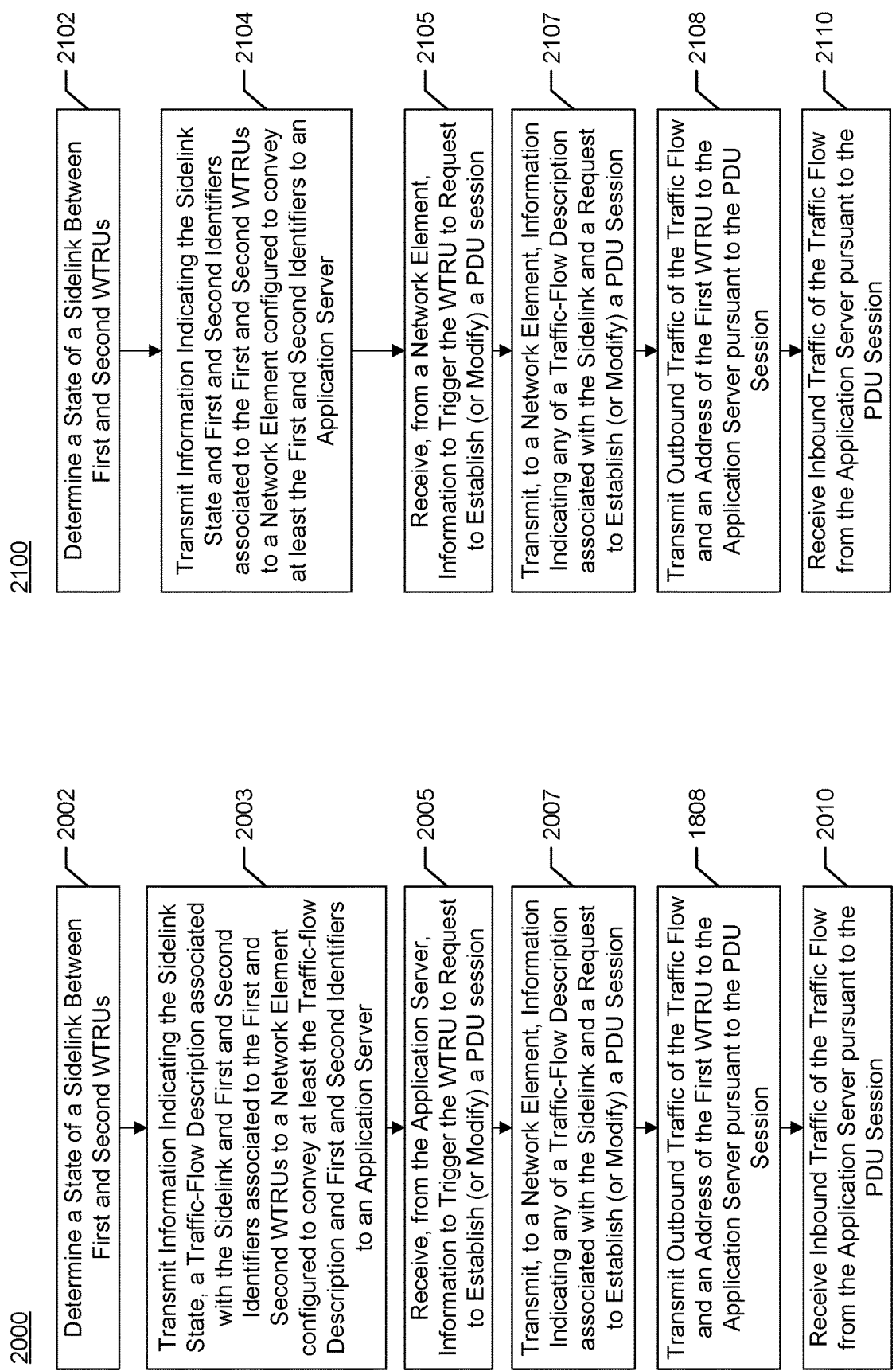

2321 — Receive, from one or more Network Elements (i) First Information Indicating a Traffic-Flow Description associated with the Sidelink and First and Second Identifiers associated to First and Second WTRUs, and (ii) Second Information Indicating the Traffic-Flow Description and Third and Fourth Identifiers associated to the First and Second WTRUs 2322 — Receive, from the First WTRU, First Traffic of the Traffic Flow and an Address of the First WTRU 2324 — Receive, from the Second WTRU, Second Traffic of the Traffic Flow and an Address of the Second WTRU 2326 — Transmit the Second Traffic Using the Address of the First WTRU 2328 — Transmit the First Traffic Using the Address of the Second WTRU

2220 — Receive, from one or more Network Elements (i) First Information Indicating a First Sidelink State, a Traffic-Flow Description associated with the Sidelink and First and Second Identifiers associated to First and Second WTRUs, and (ii) Second Information Indicating a Second Sidelink State, the Traffic-Flow Description and Third and Fourth Identifiers associated to the First and Second WTRUs 2222 — Receive, from the First WTRU, First Traffic of the Traffic Flow and an Address of the First WTRU 2224 — Receive, from the Second WTRU, Second Traffic of the Traffic Flow and an Address of the Second WTRU 2226 — Transmit the Second Traffic Using the Address of the First WTRU 2228 — Transmit the First Traffic Using the Address of the Second WTRU

METHODS, ARCHITECTURES, APPARATUSES AND SYSTEMS DIRECTED TO IMPROVED SERVICE CONTINUITY FOR OUT OF RANGE PROXIMITY WIRELESS TRANSMIT/RECEIVE DEVICES

CROSS REFERENCE TO RELATED APPLICATIONS

This application is a U.S. National Stage Application under 35 U.S.C. § 371 of International Patent Application No. PCT/US2021/015932, filed Jan. 29, 2021, which claims the benefit of U.S. Provisional Application No. 62/967,505 filed Jan. 29, 2020 which is incorporated herein by reference.

BACKGROUND

Field

Embodiments disclosed herein generally relate to wireless and/or wired communications and, for example to methods, architectures, apparatuses and systems directed to improved service continuity for out of range proximity wireless transmit/receive devices.

Related Art

Direct device-to-device connectivity enables establishment of communication paths between two devices that are within proximity/range of each other. Current mechanisms for maintaining service continuity for applications running over a direct communication path are not sufficient for the likely occurrence of the devices not remaining within range of each other to continue direct communications.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIGS. 18-24 are flow charts illustrating example flows for carrying out service continuity according to various embodiments.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
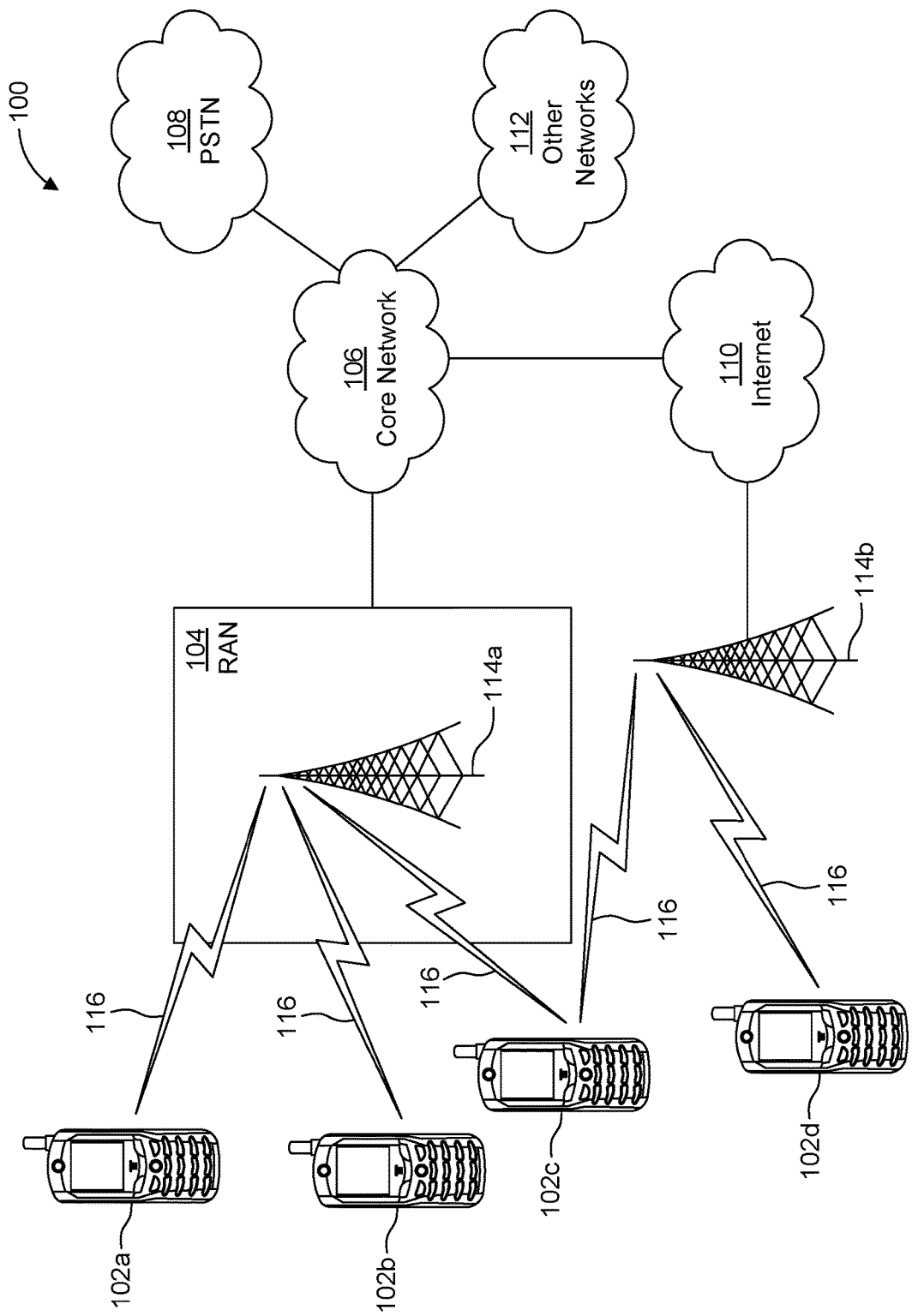
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 4A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
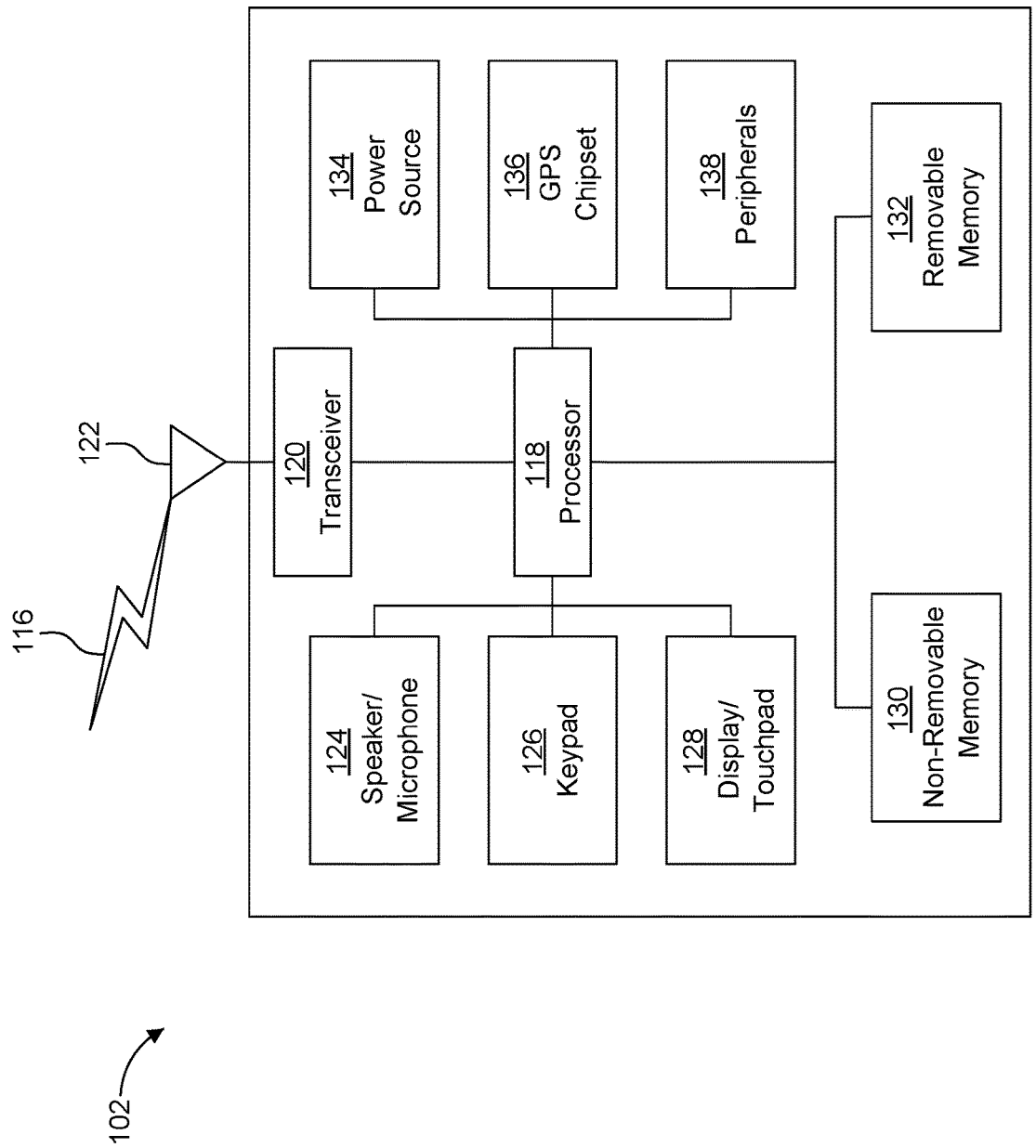
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
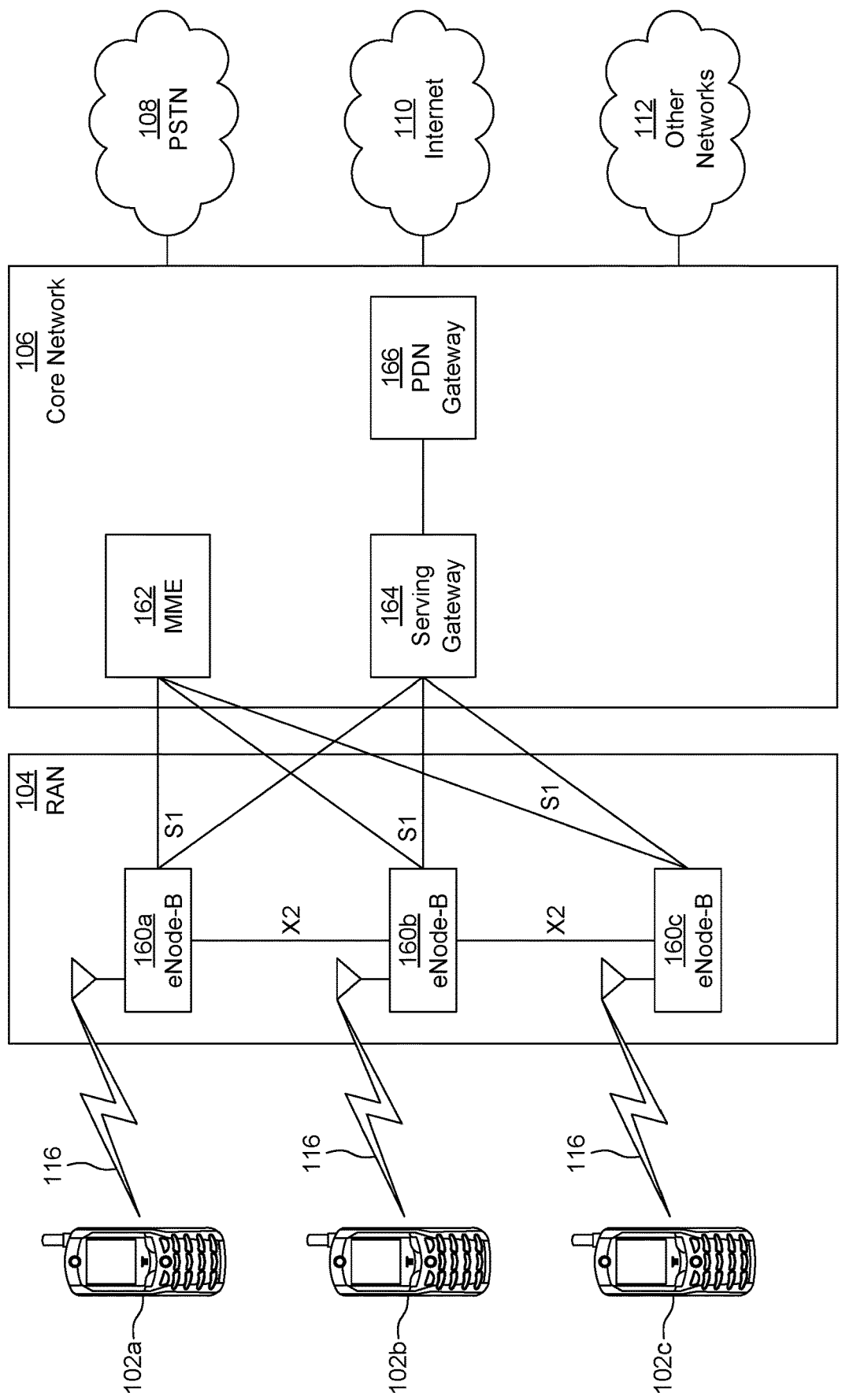
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
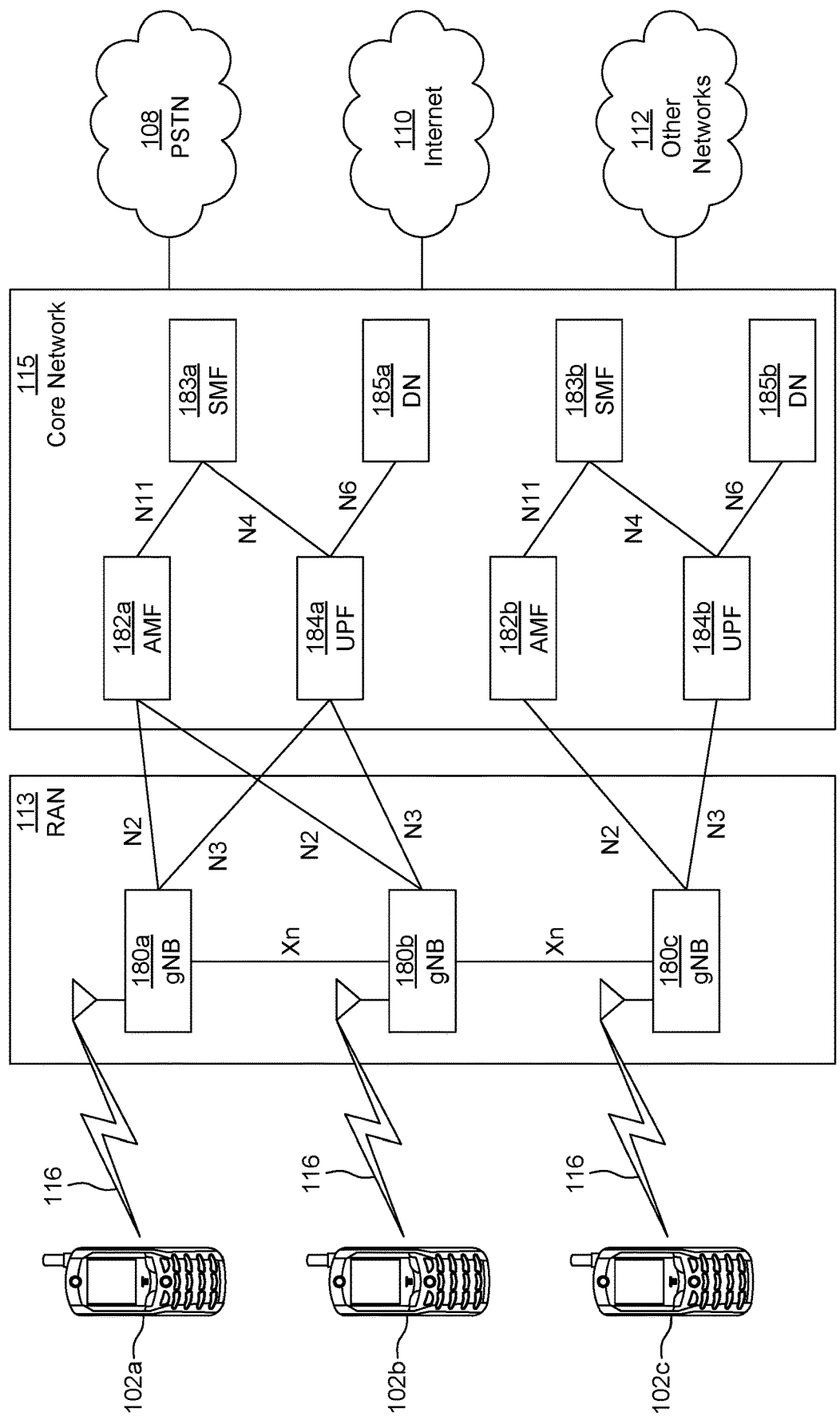
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1E:
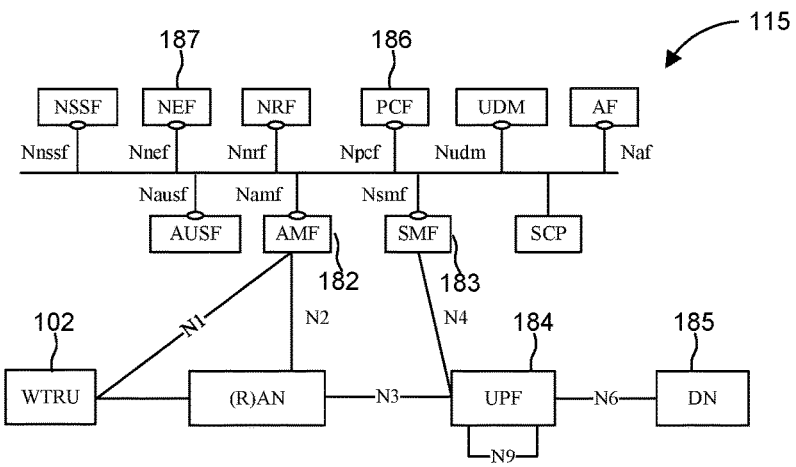
FIG. 1E is a block diagram illustrating various example elements of the example communications system.

FIG. 1E is a block diagram illustrating various example elements of the communications system 100. Such elements may be included, for example, in embodiments of the communications system 100 in which such system is configured in accordance with 5G and/or NR. The elements may include WTRU(s) 102, (R)AN(s) 113, DN(s) 185 and elements of a core network 115, including an AMF 182, an SMF 183, a UPF 184, a policy control function (PCF) 186, a network exposure function (NEF) 187 and a unified data management function ("UDM") 191. For convenience and simplicity of exposition, the terms "5G core network" and "5GC" may be used interchangeably with CN 115.

The AMF 182 may carry out various functions, including, for example, any of the following: termination of a RAN CP interface (N2), termination of NAS (N1), NAS ciphering and integrity protection, registration management, connection management, reachability management, mobility management, lawful intercept, etc. The SMF 183 may carry out various functions, including, for example, any of the following: session management (including session establishment, modification and release), IP address allocation, selection and control of user plane function(s), etc. The PCF 186 may carry out various functions, including, for example, any of the following: providing support for a unified policy framework to govern network behavior, providing policy rules to one or more control plane functions to enforce them, etc. The NEF 187 may carry out various functions, including, for example, any of the following: exposing capabilities and events, secure provisioning of information from external application to the network, etc. The UPF 184 may carry out various functions, including, for example, any of the following: operating as an anchor point for intra-/inter-RAT mobility, allocation of UE IP address, external PDU Session point of interconnect to a DN, such as DN 185, packet routing and forwarding, packet inspection, etc. The RAN 113 may be configured as any of a NG-RAN and non-3GPP AN. The RAN 113 may connect to a CN, which, for example, may be configured as a 5G core network.

Figure 1F:
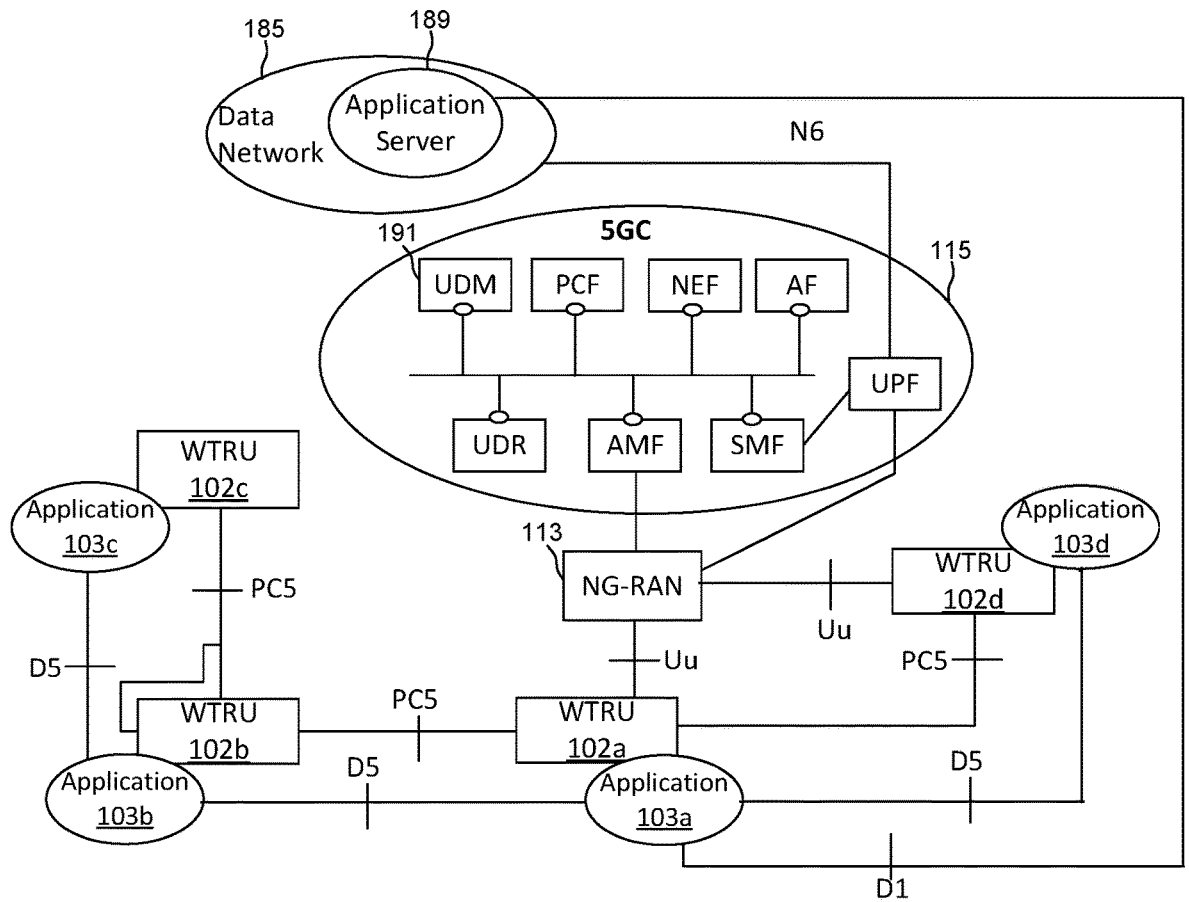
FIG. 1F is a block diagram illustrating an example architecture of the example communications system.

FIG. 1F is a block diagram illustrating an example architecture of the communications system 100 configured in accordance with 5G and/or NR. For convenience and simplicity of exposition, the terms "5G System" and its abbreviation "SGS" may be used herein to refer to the communications system 100 configured in accordance with 5G and/or NR. The example architecture shown in FIG. 1F may be suitable for various services in SGS, including any of proximity-based services (ProSe), vehicle-to-everything (V2X) services and other device-to-device (D2D) communication services. The example architecture may include WTRUs 102a-d, an NG-RAN 113, a DN 185 and a 5GC 115.

Each of the WTRUs 102a-d may include an application ("WTRU application") 103. The WTRU application may be, for example, any of a ProSe application, a V2X application and other like-type applications). The DN 185 may include an application server 189. The application server 189 may include one or more applications that service any of the WTRU applications.

D1 is a reference point between a WTRU application 103 and an application in the application server 189. D5 is a reference point between the WTRU applications 103 (e.g., between and/or among two or more WTRU applications 103 of the WTRUs 102a-d). PC5 is a D2D interface for direct D2D communications between and/or among two or more of the WTRUs 102a-d. The PC5 interface may be configured, for example, as any of an LTE-based PC5, NR-based PC5 and the like. The terms PC5 interface and "sidelink" (at the PHY layer) may be referred to herein interchangeably.

As noted above, direct D2D communication, such as ProSe direct communication, enable establishment of communication paths between two or more of the WTRUs 102 that are within proximity/range of each other. Direct D2D discovery, such as ProSe direct discovery, may be used by a WTRU 102 to identify other WTRUs in proximity. Details for provisioning the WTRUs for direct communication and/or direct discovery and/or for both in-coverage and out-of-coverage scenarios may be found, for example, in 3GPP TS 23.303 V15.1.0

Sidelink communication may be carried out using any of an autonomous transmission mode and a scheduled transmission mode. For example, sidelink communications may be carried out using an autonomous transmission mode for WTRUs that are out-of-coverage (CM-IDLE and RRC_IDLE). In the autonomous transmission mode, radio resources may be read from a system information block (SIB), such as SIB 18. For the WTRUs that are in-coverage (CM-CONNECTED/CM-IDLE, RRC_IDLE/RRC_CONNECTED with or without active PDU sessions), the sidelink communication may be carried out using the scheduled transmission mode or the autonomous transmission mode. Table 1 lists, for each of ProSe direct communication and ProSe direct discovery, which transmission mode is selectable based on whether the WTRU is in- or out-of-coverage. Table 1 also lists, for each of ProSe direct communication and ProSe direct discovery, whether the transmission resources are preconfigured or indicated by a RAN.

TABLE 1

|  | Scheduled Transmission Mode | Autonomous Transmission Mode |
|---|---|---|
| ProSe Direct Communication | Only in-coverage. Resources for transmission are indicated by RAN. | In-coverage and Out of coverage. Resources pools for transmission are pre-configured. |
| ProSe Direct Discovery | Only in-coverage. Resources for transmission are indicated RAN. | In-coverage and Out of coverage. Resources pools for transmission are pre-configured. |

Figure 2A:
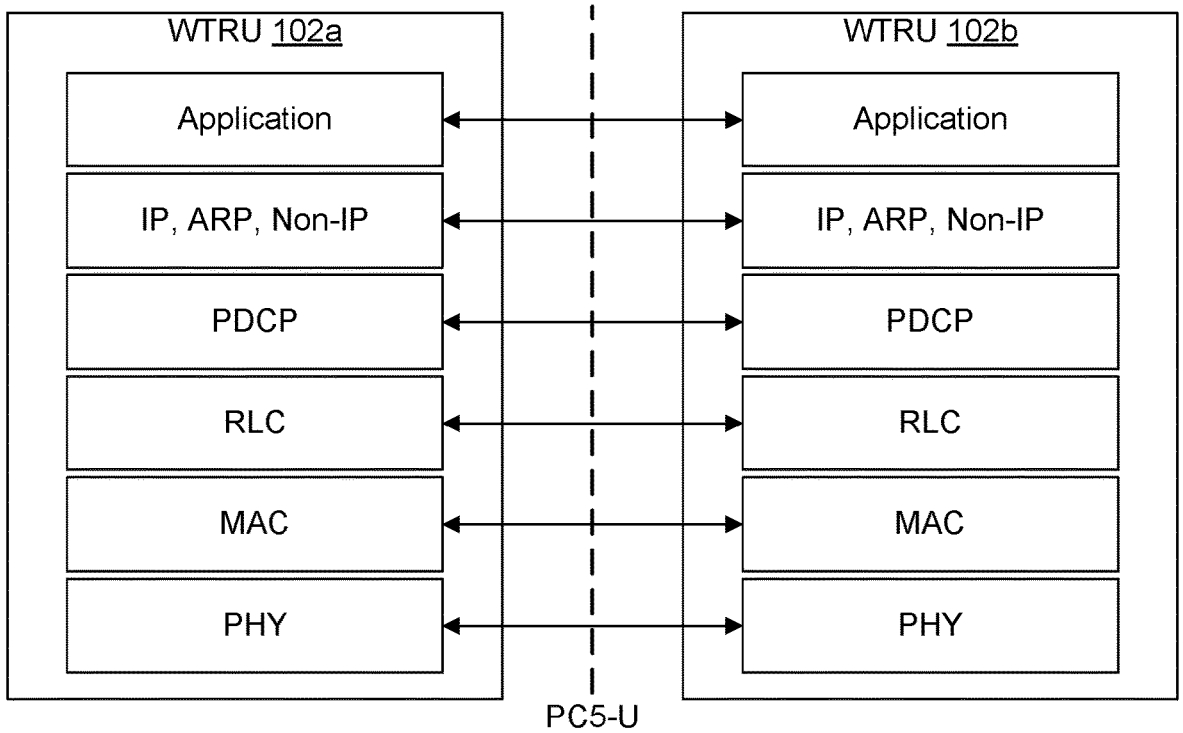
FIG. 2A illustrates an example user plane for a PC5 interface (PC5-U)

FIG. 2A illustrates an example user plane for a PC5 interface (PC5-U). Example details of the PDCP/RLC/MAC/PHY functionality may be found for example in 3GPP TS 36.300.

Figure 2B:
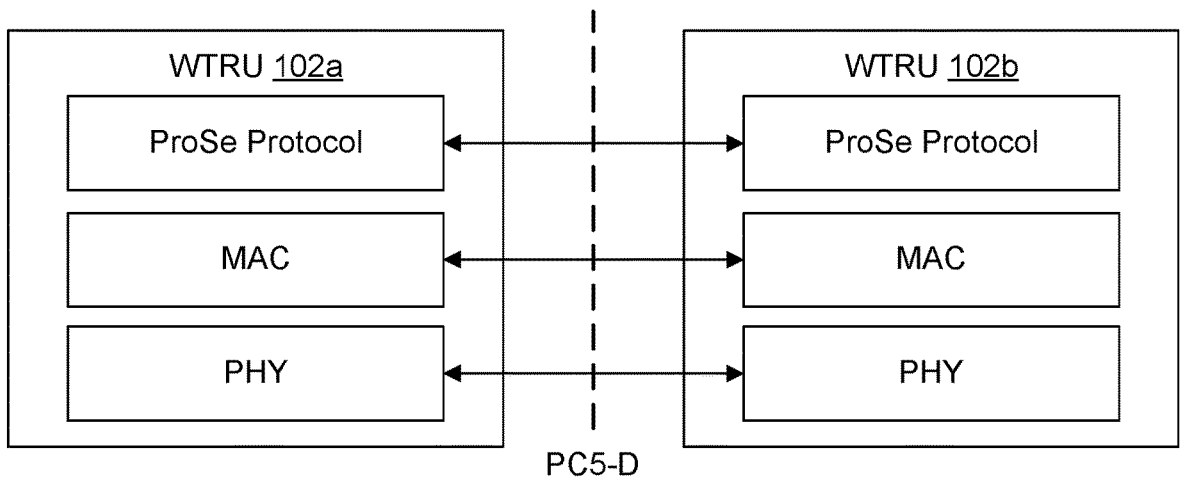
FIG. 2B illustrates an example discovery plane PC5 interface (PC5-D)

FIG. 2B illustrates an example discovery plane PC5 interface (PC5-D). The ProSe protocol may be used for handling ProSe direct discovery. Example detail of a PC5-D may be found for example in 3GPP TS 24.334.

Figure 2C:
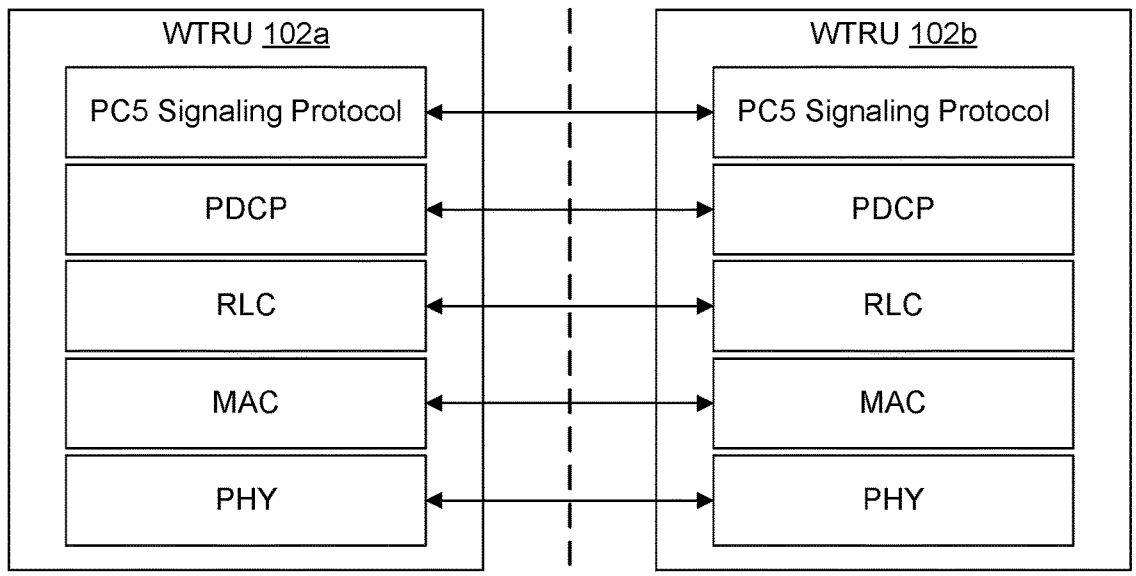
FIG. 2C illustrates an example PC5 signaling protocol stack.

FIG. 2C illustrates an example PC5 signalling protocol stack. The PC5 signalling protocol stack is used for control plane signalling over PC5, including, for example, signalling to establish, maintain and release of the secure layer-2 link over the PC5 interface, TMGI monitoring requests, Cell ID announcement requests etc. The SDU Type field (which may be 3 bits) in the PDCP header may be used to discriminate between IP, ARP and PC5 signalling protocol.

Figure 2D:
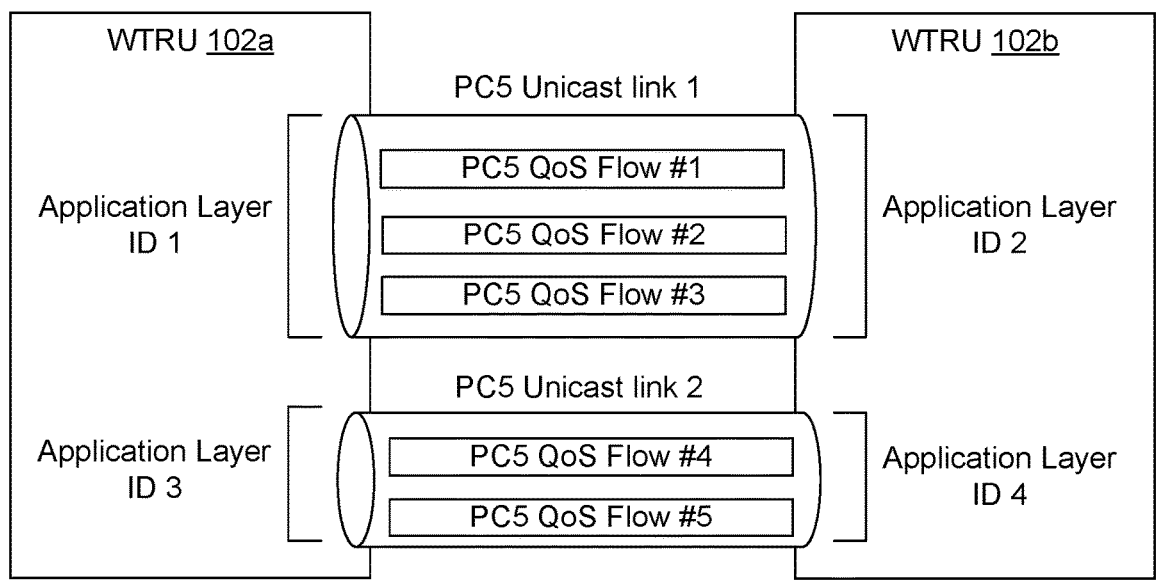
FIG. 2D illustrates granularity of a plurality of PC5 unicast links.

A unicast mode of communication may be supported over PC5 reference (e.g., the NR based PC5 reference point). FIG. 2D illustrates granularity of a plurality of PC5 unicast links. The granularity, as shown, is one PC5 unicast link for each pair of application layer identifiers of the WTRUs 102a, 102b. One PC5 unicast link may support one or more services if the services are associated with a same pair of application layer identifiers. As shown, the WTRU 102a has two PC5 unicast links with a WTRU 102b. The first of the PC5 unicast links may be identified by application layer identifier 2 and the second of the PC5 unicast links may be identified by application layer identifier 4. One PC5 unicast link may support one or more PC5 QoS flows for the same or different services.

When the application layer initiates a service that uses a PC5 unicast communication, the WTRU 102a may establish a PC5 unicast link with the corresponding WTRU 102b using a layer-2 link establishment procedure. During the unicast link establishment, each of the WTRUs 102a, 102b may self-assign a PC5 link identifier and may associate the self-assigned PC5 link identifier with a link profile for the established unicast link. The PC5 link identifier may have a unique value within the WTRU.

Figure 2E:
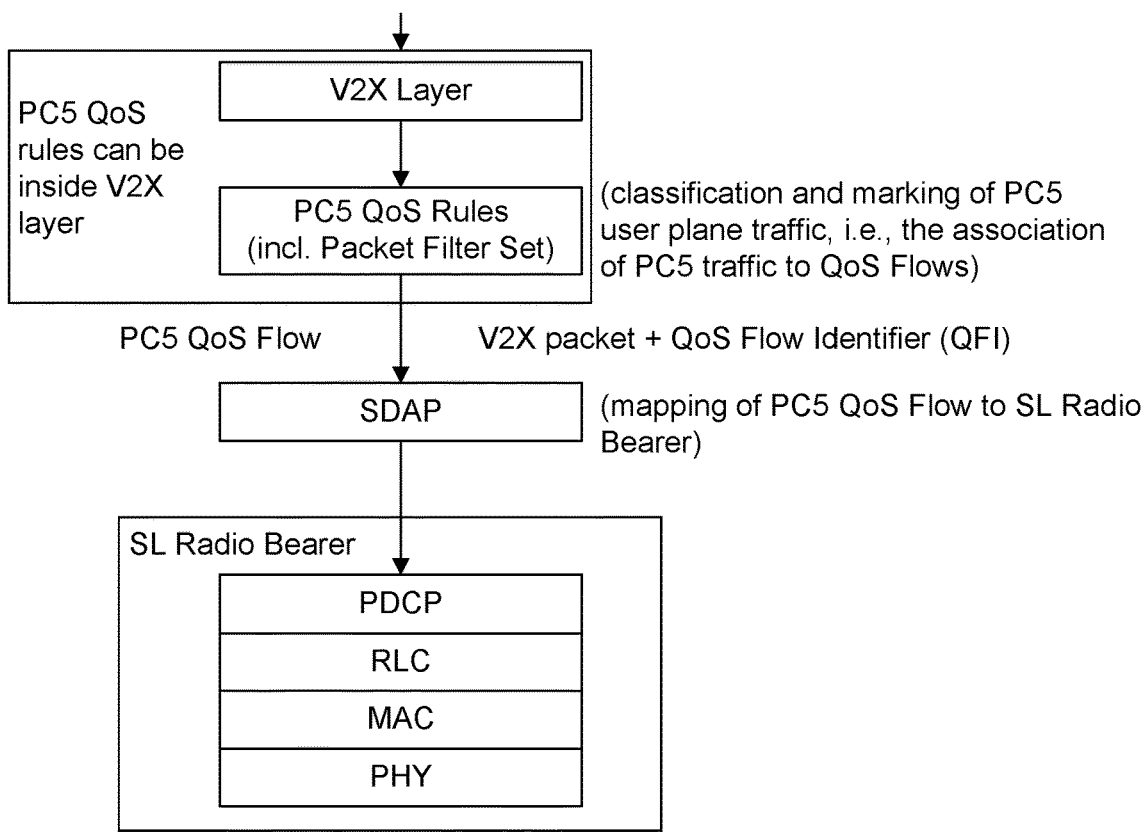
FIG. 2E is a block diagram illustrating an example mapping of a per-flow QoS model for a PC5 interface.

The link profile identified by the PC5 link identifier may include any of an application layer identifier of the WTRU 102a, a layer-2 identifier of the WTRU 102a, application layer identifier of the WTRU 102b, a layer-2 identifier of the WTRU 102b and information about one or more PC5 QoS flows. The information about the one or more PC5 QoS flows may include one or more PC5 QoS flow identifiers (PFIs) along with one or more QoS parameters (e.g., PC5 QoS context and PC5 QoS rule(s)) for each PFI. FIG. 2E is a block diagram illustrating an example mapping of a per-flow QoS model for a PC5 interface, such as, for example, a NR PC5 interface.

The PC5 link identifier and PFIs remain unchanged for an established unicast link regardless of any changes of any of the application layer identifiers and the layer-2 identifiers. A beneficial consequence of the PFIs remaining unchanged is that an access stratum (AS) layer of a WTRU may identify a PC5 QoS flow based on (e.g., solely based on) a corresponding PFI provided to it. The AS layer, for example, need not rely on any of the source and destination layer-2 identifiers (and, in turn, need not track any changes thereto) to identify a PC5 QoS flow.

The PC5 link identifier may be used to indicate the PC5 unicast link to the application layer. The application layer may identify the PC5 unicast link based on (e.g., solely based on) the PC5 link identifier provided to it. The PC5 link identifier may be (at least locally) unique to allow the application layer to identify a corresponding PC5 unicast link from among a plurality of unicast links associated with one service type (e.g., if one WTRU establishes a plurality of unicast links with one or more other WTRUs for a same service type).

As noted, current mechanisms for maintaining service continuity for applications running over a PC5 communication path are not optimized for the likely occurrence of WTRUs not remaining within proximity/range of each other to continue D2D communications. The current PC5 signalling protocol provides keep alive functionality. The WTRUs use this functionality to, among other things, detect whether the PC5 sidelink is or remains (or, conversely, is not or is no longer) viable for communications between WTRUs. If a WTRU detects that the PC5 sidelink is not or is no longer viable for communications (e.g., due to timeout), then an implicit layer-2 link release procedure over PC5 is carried out. The implicit layer-2 link release procedure is as follows:

one WTRU ("WTRU 102a") sends a disconnect request message to the other WTRU ("WTRU 102b");

WTRU 102a deletes all context data associated with the layer-2 link;

after reception of the disconnect request message, WTRU 102b sends to WTRU 102a a disconnect response message (e.g., as an acknowledgement); and WTRU 102b deletes all context data associated with the layer-2 link.

A consequence of carrying out the implicit layer-2 link release procedure is that, because non-routable layer-2 addresses are used for PC5 flows, once the layer-2 link is released the WTRUs lack routable addresses to which to forward application (service) packets (e.g., ProSe packets. Another consequence of carrying out the implicit layer-2 link release procedure is that user plane applications and corresponding PC5 flows running over the PC5 sidelink are inevitably interrupted and eventually terminate.

Service continuity is possible with existing 3GPP mechanisms. However, the existing 3GPP mechanisms require many messages exchanges—no less 33 message exchanges.

As would be appreciated by a person of skill in the art based on the teachings herein, encompassed within the embodiments described herein, without limitation, are procedures, methods, architectures, apparatuses, systems, devices, and computer program products directed to improved service continuity in connection with a likely occurrence of WTRUs not remaining within proximity/range of each other to continue D2D communications.

Among the procedures, methods, architectures, apparatuses, systems, devices, and computer program products is a first method that may be implemented in a first WTRU and that may include any of: determining a state of a sidelink ("sidelink state") between the first WTRU and a second WTRU; transmitting first information, indicating the sidelink state and first and second identifiers associated with the first and second WTRUs, to a first network element of a CN from which at least the first and second identifiers are conveyed to an application server; receiving, from a second network element of the core network, information to trigger the WTRU to request to establish or modify a PDU session; transmitting, to the second network element, second information indicating a description of a traffic flow ("traffic-flow description") associated with the sidelink and a request to establish or modify the PDU session; transmitting outbound traffic of the traffic flow and an address of the first WTRU to the application server pursuant to the PDU session; and receiving inbound traffic of the traffic flow from the application server pursuant to the PDU session. In various embodiments, the first network element may comprise an AMF, and the second network element may comprise an SMF.

Among the procedures, methods, architectures, apparatuses, systems, devices, and computer program products is a second method that may be implemented in a first WTRU and that may include any of: determining a sidelink state of a sidelink between the first WTRU and a second WTRU; transmitting first information, indicating the sidelink state and first and second identifiers associated with the first and second WTRUs, to a network element of a core network from which at least the first and second identifiers are conveyed to an application server; transmitting, to the network element, second information indicating a traffic-flow description associated with the sidelink and a request to establish or modify a PDU session; transmitting outbound traffic of the traffic flow and an address of the first WTRU to the application server pursuant to the PDU session; and receiving inbound traffic of the traffic flow from the application server pursuant to the PDU session. In various embodiments, the network element may comprise an SMF.

Among the procedures, methods, architectures, apparatuses, systems, devices, and computer program products is a third method that may be implemented in a first WTRU and that may include any of: determining a sidelink state of a sidelink between the first WTRU and a second WTRU; transmitting first information, indicating the sidelink state, a traffic-flow description associated with the sidelink and first and second identifiers associated to the first and second WTRUs, to a network element of a core network from which at least the traffic-flow description and the first and second identifiers are conveyed to an application server; transmitting outbound traffic of the traffic flow and an address of the first WTRU to the application server pursuant to a PDU session; and receiving inbound traffic of the traffic flow from the application server pursuant to the PDU session. In various embodiments, the third method may include transmitting second information indicating a request to establish the PDU session on condition that the first WTRU is not in a connected mode.

Among the procedures, methods, architectures, apparatuses, systems, devices, and computer program products is a fourth method that may be implemented in a first WTRU and that may include any of: determining a sidelink state of a sidelink between the first WTRU and a second WTRU; transmitting first information, indicating the sidelink state, a traffic-flow description associated with the sidelink and first and second identifiers associated with the first and second WTRUs, to a first network element of a core network from which at least the traffic-flow description and the first and second identifiers are conveyed to an application server; receiving, from the first network element or a second network element of the core network, information to trigger a request to establish or modify a PDU session; transmitting second information indicating a request to establish or modify a PDU session; transmitting outbound traffic of the traffic flow and an address of the first WTRU to the application server pursuant to the PDU session; and receiving inbound traffic of the traffic flow from the application server pursuant to the PDU session.

In various embodiments of any of the first, second, third and fourth methods, determining the sidelink state may include any of: monitoring for keep alive transmissions; and determining the sidelink state based on a number of keep alive transmissions received within a time period. In various embodiments, the sidelink state may be (i) a first value if the number of keep alive transmissions received within the time period fails to satisfy a first threshold, and (ii) a second value if the number of keep alive transmissions received within the time period satisfies a second threshold. In various embodiments, the first and second thresholds may be the same threshold. In various embodiments, the first value may indicate the sidelink is not or no longer viable for communications with the second WTRU.

In various embodiments, any of the first, second, third and fourth methods may include any of receiving an address of the second WTRU from the application server; and transmitting outbound traffic of the traffic flow using the address of the second WTRU.

Among the procedures, methods, architectures, apparatuses, systems, devices, and computer program products is a fifth method that may be implemented in an application server and that may include any of: receiving, from one or more network elements of one or more core networks, (i) first information indicating a first sidelink state of a sidelink between a first WTRU, and a second WTRU, a traffic-flow description of a traffic flow associated with the sidelink and first and second identifiers associated with the first and second WTRUs, wherein the first information originated from the first WTRU; and (ii) second information indicating a second sidelink state of the sidelink, the traffic-flow description and third and fourth identifiers associated to the first and second WTRUs, wherein the second information originated from the second WTRU; receiving, from the first WTRU, first traffic of the traffic flow and an address of the first WTRU; receiving, from the second WTRU, second traffic of the traffic flow and an address of the second WTRU; transmitting the second traffic using the first address; and transmitting the first traffic using the second address.

In various embodiments, receiving the first and second information from the network elements of the core networks may include any of (i) receiving the first information from a first network element of the network elements pursuant to a first subscription with the first network element to receive the first information responsive to a first event; and (ii) receiving the second information from a second network element of the network elements pursuant to a second subscription with the second network element to receive the second information responsive to a second event. In various embodiments, the first event may be when the first state indicates the sidelink is not or no longer viable for communications with the second WTRU, and the second event may be when the second state indicates the sidelink is not or no longer viable for communications with the second WTRU.

In various embodiments, the fifth method may include any of: obtaining the first subscription from the first network element; and obtaining the second subscription from the second network element. In various embodiments, the fifth method may include any of: transmitting the second address of the second WTRU to the first WTRU; and transmitting the first address of the first WTRU to the second WTRU.

In various embodiments, the fifth method may include any of: transmitting to the first network element or to a third of the network elements, third information to trigger establishment a third PDU session or modification of the a first PDU session; and transmitting to the second network element or to a fourth of the network elements, fourth information to trigger establishment of a fourth PDU session or modification of the second PDU session.

In various embodiments of the fifth method, the network elements may include any of: a first AMF associated with the first WTRU, a second AMF associated with the second WTRU, and an SMF associated with the first and second WTRUs.

In various embodiments of any of the first, second, third fourth and fifth methods, the first identifier may include any of an application layer identifier of the first WTRU and a layer-2 identifier of first the WTRU, and the second identifier may include any of an application layer identifier of the second WTRU and a layer-2 identifier of the second WTRU. In various embodiments of the fifth method, the third identifier may include any of an application layer identifier of the first WTRU and a layer-2 identifier of first the WTRU, and the fourth identifier may include any of an application layer identifier of the second WTRU and a layer-2 identifier of the second WTRU.

In various embodiments of any of the first, second, third fourth and fifth methods, the traffic-flow description may include any of a PFI and one or more QoS rules.

In various embodiments of any of the first, second, third fourth and fifth methods, the first information may be transmitted as, or in, in a notification message. In various embodiments of the fifth method, the second information may be transmitted as, or in, in a notification message.

In various embodiments of any of the first, second, third, fourth and fifth methods, the first information is transmitted as, or in, any of an NAS message and an RRC message. In various embodiments of the fifth method, the second information is transmitted as, or in, any of an NAS message and an RRC message.

In various embodiments of the fifth method, the first sidelink state may be (i) a first value if the number of keep alive transmissions received within the time period fails to satisfy a first threshold, and (ii) a second value if the number of keep alive transmissions received within the time period satisfies a second threshold. In various embodiments, the first and second thresholds may be the same threshold.

In various embodiments of the fifth method, the second sidelink state may be (i) the first value if the number of keep alive transmissions received within the time period fails to satisfy a third threshold, and (ii) a fourth value if the number of keep alive transmissions received within the time period satisfies a fourth threshold. In various embodiments, the third and fourth threshold may be the same threshold. In various embodiments, the first, second, third and fourth thresholds may be the same threshold. In various embodiments, the first threshold may be the same as the third threshold, and the second threshold may be the same as the fourth threshold.

In various embodiments of the first, second, third, fourth and/or fifth methods, the first identifier, the second identifier, the third identifier, the fourth identifier and the PFIs may be included in a link profile identified by a PC5 link identifier.

Included among the procedures, methods, architectures, apparatuses, systems, devices, and computer program products is a sixth method that may be implemented in a WTRU and that may include generating a PC5 notification report based on PC5 inviability information associated with a PC5 sidelink, wherein the PC5 notification report may include one or more identifiers associated with the PC5 sidelink ("sidelink identifiers"), such as, e.g., one or more of the identifiers included in a link profile identified by a PC5 link identifier; invoking an entity of a communications protocol stack to convey the PC5 notification report to a network element; sending the PC5 notification report to the network element in a message according to a protocol of the entity of the communications protocol stack; on condition that the WTRU is not in a connected connection management state: transitioning to the connected management state and initiating a protocol data unit (PDU) session establishment request including one or more QoS rules/packet filter sets associated with the one or more sidelink identifiers, such as, for example, one or more of the QoS rules/packet filter sets included in a link profile identified by the PC5 link identifier; on condition that the WTRU is in the connected connection management state, initiating a PDU session modification request including the one or more QoS rules/packet filter sets associated with the one or more sidelink identifiers; and transmitting packets to an application server using a PDU session established in response to the PDU session establishment request or a PDU session as modified in response to the PDU session modification request. In an embodiment, the method may further include determining whether the PC5 sidelink is not or is no longer viable for communications with another WTRU; and providing, to a sidelink event exposure function (SL-EEF), information indicating the PC5 sidelink interface is not or is no longer viable.

In an embodiment, the method may further include providing the one or more active PC5 link identifiers to a SL-EEF.

In an embodiment, the one or more sidelink identifiers may include any of an application layer identifier and a layer-2 identifier and a set of PFIs. In an embodiment, each PFI may be associated with one or more QoS parameters.

In an embodiment, the PC5 notification report may be generated, and the entity of a communications protocol stack may be invoked by a SL-EEF. In an embodiment, the entity of a communications protocol stack may be any of a NAS and an RRC entity. In an embodiment, the protocol of the communications protocol may be any a NAS protocol and an RRC protocol.

In an embodiment, the message according to a protocol of the entity of the communications protocol stack may be a NAS Service Request message, and the PC5 notification report may be carried in a NAS message container of the NAS Service Request message.

In an embodiment, the message according to a protocol of the entity of the communications protocol stack may be a RRC MeasurementReport message, and the PC5 notification report may be carried in an information element (IE) of the RRC MeasurementReport message.

In an embodiment, the PDU session modification request may include one or more IEs configured to carry any of the QoS rules/packet filter sets and PFIs. In an embodiment, the PDU session establishment request may include one or more IEs configured to carry any of the QoS rules/packet filter sets and PFIs. In an embodiment, the IEs may include any of an extended protocol configuration options IE, a Requested QoS rules IE and Requested QoS flow descriptions IE.

In an embodiment, the method may further include receiving a mapping between the sidelink identifiers and one or more routable addresses on which to transmit the packets.

Included among the procedures, methods, architectures, apparatuses, systems, devices, and computer program products is a method that may be implemented in a network element and that may include receiving a PC5 notification report in a message according to a protocol of an entity of the communications protocol stack, wherein the PC5 notification report includes one or more sidelink identifiers associated with a PC5 sidelink of a WTRU; on condition that the WTRU is not in a connected connection management state: receiving a PDU session establishment request including one or more QoS rules/packet filter sets associated with the sidelink identifiers; on condition that the WTRU is in the connected connection management state, receiving a PDU session modification request including the QoS rules/packet filter sets; and providing at least the QoS rules/packet filter sets associated with the sidelink identifiers to an application server.

In an embodiment, the sidelink identifiers may include any of an application layer identifier and a layer-2 identifier and a set of PFIs. In an embodiment, each PFI is associated with one or more QoS parameters.

In an embodiment, the entity of a communications protocol stack may be any of a NAS and an RRC entity. In an embodiment, the protocol of the communications protocol may be any a NAS protocol and an RRC protocol. In an embodiment, the message according to a protocol of the entity of the communications protocol stack may be a NAS Service Request message, and the PC5 notification report may be carried in a NAS message container of the NAS Service Request message.

In an embodiment, the message according to a protocol of the entity of the communications protocol stack may be a RRC MeasurementReport message, and the PC5 notification report may be carried in an IE of the RRC MeasurementReport message. In an embodiment, the PDU session modification request may include one or more IEs configured to carry any of the QoS rules/packet filter sets and PFIs. In an embodiment, the PDU session establishment request may include one or more IEs configured to carry any of the QoS rules/packet filter sets and PFIs. In an embodiment, the IEs may include any of an extended protocol configuration options IE, a Requested QoS rules IE and Requested QoS flow descriptions IE.

Among the procedures, methods, architectures, apparatuses, systems, devices, and computer program products is an apparatus, which may include any of a processor and memory, configured to perform any of the methods and embodiments thereof directed to improved service continuity provided herein. In various embodiment, the apparatus may be, may be configured as and/or may be configured with elements of a WTRU. In various embodiment, the apparatus may be, may be configured as and/or may be configured with elements of a network element. In various embodiment, the apparatus may be, may be configured as and/or may be configured with elements of an application server.

Among the procedures, methods, architectures, apparatuses, systems, devices, and computer program products is a system, which may include any of a processor and memory, configured to perform any of the methods and embodiments thereof directed to improved service continuity provided herein. Also among the procedures, methods, architectures, apparatuses, systems, devices, and computer program products is a tangible computer readable storage medium having stored thereon computer executable instructions for performing any of the methods and embodiments thereof directed to improved service continuity provided herein.

For convenience and simplicity of exposition, various embodiments are described in connection with service continuity between a PC5 interface and an Uu interface. Those skilled in the art will recognize that such teachings are applicable for service continuity in other situations, such as, in connection with movement of WTRUs across different PLMNs, NPNs (SNPNs or PNI-NPNs).

Improved mechanisms for service continuity between the PC5 interface and the Uu interface in connection with a likely occurrence of WTRUs not remaining within proximity/ProSe communication range of each other are provided. The service continuity mechanisms may be carried out according to the following.

1. PC5 notification reporting: A WTRU 102a may generate a PC5 notification report and may send the PC5 notification report to the application server 189 (e.g., via one or more of the networks of the communications system 100). The generation and/or sending of the PC5 notification report may be triggered in response to a determination that the PC5 sidelink is not or no longer viable for communications between the WTRU 102a and one or more of the WTRU 102b/c/d. The PC5 notification report may include contextual information regarding a PC5 unicast link. The contextual information may include a PC5 link profile associated to the PC5 unicast link and a state of the PC5 layer-2 link, e.g. application layer identifiers and PFI(s).

2. Migration of some or all of existing PC5 flows to new and/or existing PDU sessions: The WTRU 102a may request migration of existing PC5 flows to a new PDU session using a WTRU requested PDU session establishment request. The WTRU 102a may request migration of existing PC5 flows to an existing PDU session using a WTRU requested PDU session modification request. The WTRU requested PDU session establishment request and/or the WTRU requested PDU session modification request may include QoS rules (packet filter sets) associated with the sidelink identifier(s).

3. Route packets based on a mapping between the PC5 interface and the Uu interface. The ProSe application server may construct a mapping between the unicast link profiles attributes (derived from the PC5 notification report) and routable destination addresses of the WTRUs (derived from the establishment or modification of PDU sessions). The ProSe application server may subsequently forward ProSe packets to the WTRUs using the constructed mapping table. Alternatively and/or additionally, the ProSe application server may provide (e.g., send) the constructed mapping table to the WTRUs so that subsequent ProSe packets may be addressed using routable destination addresses.

For convenience and simplicity of exposition, the mechanisms are described in connection with service continuity for two WTRUs and for various connection management states. Those skilled in the art will recognize that the same mechanisms are applicable to more than two WTRUs and/or to other connection management states.

Figure 3:
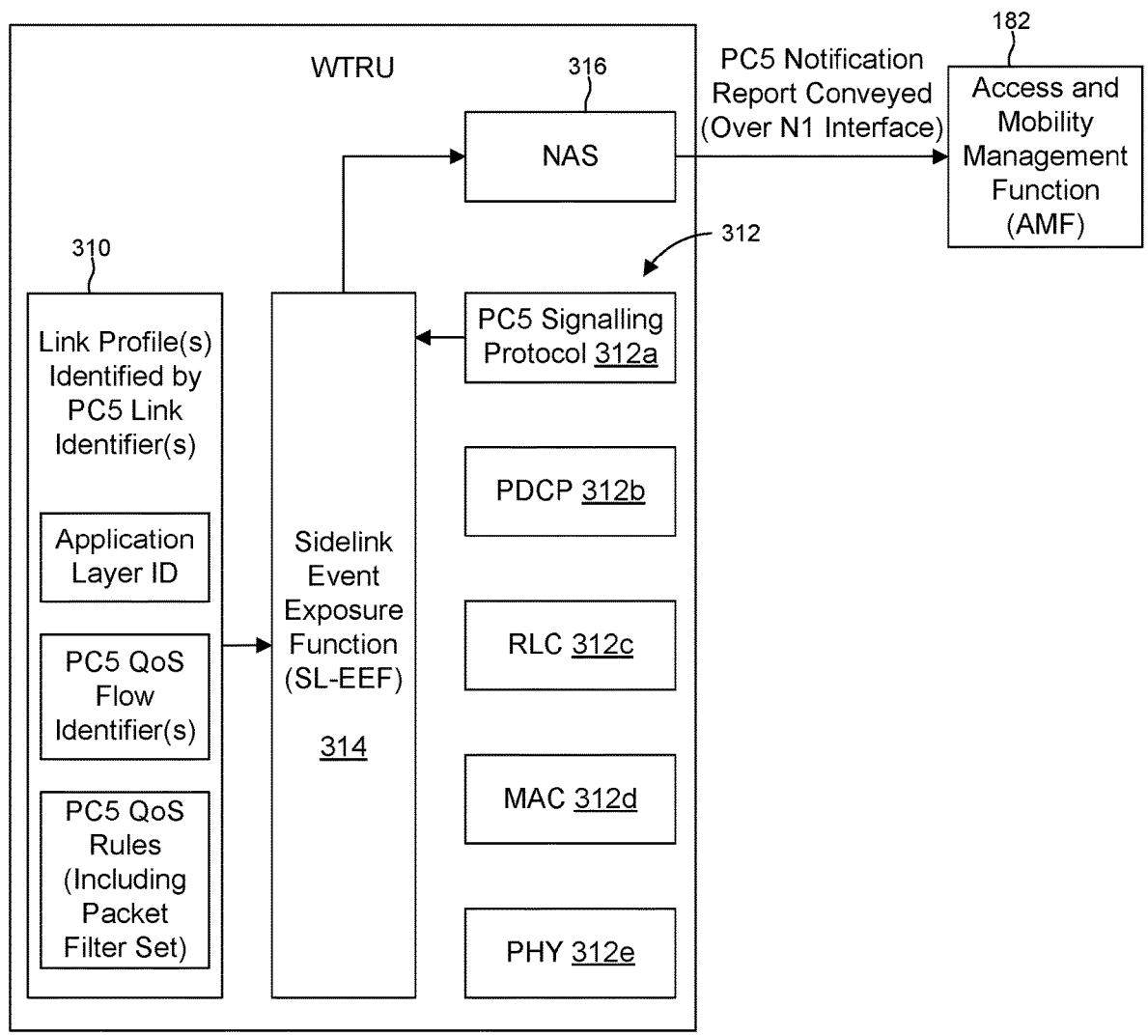
FIG. 3 is a block diagram illustrating an example architecture of a WTRU according to an embodiment.

FIG. 3 is a block diagram illustrating an example architecture of a WTRU ("WTRU architecture") 300 according to an embodiment. The WTRU architecture 300 may be suitable for generating a PC5 notification report and/or conveying a PC5 notification report to an AMF, such as AMF 182 (FIG. 1). The WTRU architecture 300 may include a link profile 310, a PC5 signaling protocol stack 312, a sidelink event exposure function (SL-EEF) 314 and a NAS entity 316. The PC5 signaling protocol stack 312 may include a PC5 signaling protocol entity 312a, a PDCP entity 312b, an RLC entity 312c, a MAC entity 312d and a PHY entity 312e.

Keep alive functionality of the PC5 signaling protocol entity may be used to determine whether the PC5 sidelink is or remains (or, conversely, is not or is no longer) viable for communications with a neighboring WTRU (not shown in FIG. 3). If the PC5 sidelink is determined not to be or no longer viable for communications (e.g., due to timeout), information indicating the PC5 sidelink is not or is no longer viable (e.g., a PC5 keep alive timeout message or indicator) may be provided to the SL-EEF 314. Functionality other than (or in lieu of) keep alive functionality may be used to determine whether the PC5 sidelink is or remains (or, conversely, is not or is no longer) viable for communications with the neighboring WTRU. This other functionality might not be a function of the PC5 signaling protocol entity, but rather of another entity now shown, and/or may provide the information indicating the PC5 sidelink is not or is no longer viable ("PC5 inviability information") to SL-EEF 314. The PC5 inviability information may be provided to the SL-EEF 314 on any of a push or pull basis.

The SL-EEF 314 may obtain the PC5 inviability information from the PC5 signaling protocol or other entity. The SL-EEF 314 may obtain one or more sidelink identifiers from the link profile 210. The SL-EEF 314 may generate a PC5 notification report using the PC5 inviability information and the sidelink identifiers. The SL-EEF 314, for example, may concatenate or otherwise combine the PC5 inviability information and the sidelink identifiers to form the PC5 notification report.

The SL-EEF 314 may provide the PC5 notification report to NAS entity 216 for transmission to AMF 182. The NAS entity 216 may invoke the NAS protocol to convey the PC5 notification report to the AMF, e.g., using an N1 interface.

Figure 4:
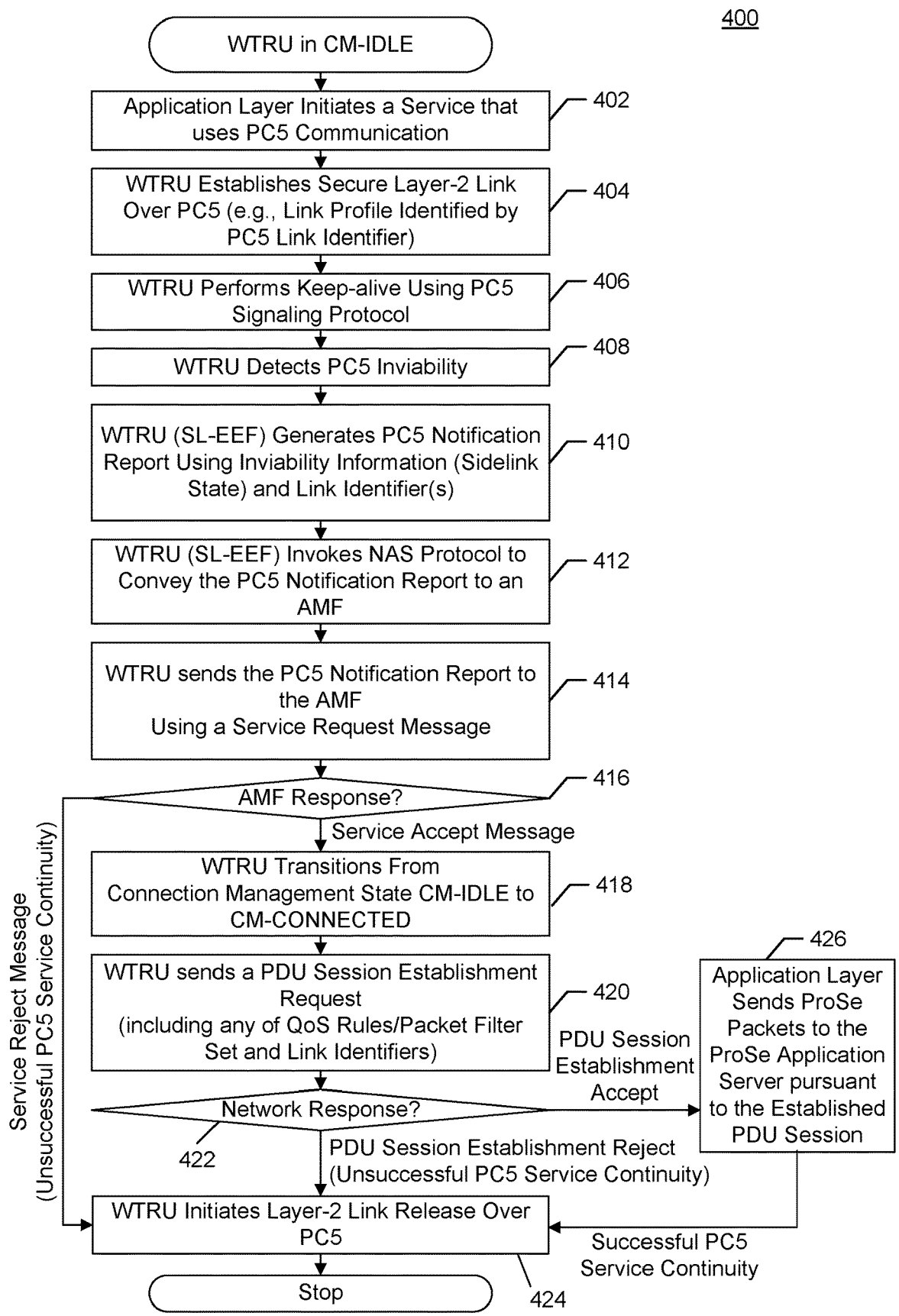
FIG. 4 is a flow chart illustrating an example flow for carrying out service continuity according to various embodiments.

FIG. 4 is a flow chart illustrating an example flow 400 for carrying out service continuity according to various embodiments. The flow 400 may be suitable for carrying out service continuity in which two WTRUs, engaged in sidelink communications, are in connection management state CM-IDLE and RRC_IDLE with no active PDU sessions. For convenience and simplicity of exposition, the flow 400 is described with reference to the WTRU architecture 200 (FIG. 2), the PC5 unicast links (FIG. 2D) and the architecture of the communications system 100 (FIG. 1). The flow 400 may be carried out using different architectures as well.

Further, as one of ordinary skill would recognize, some of the flow 400 may be separately carried out by both of the two WTRUs. And as such, for convenience and simplicity of exposition in the description that follows, the nomenclature "WTRU 102a (WTRU 102b)" and "WTRU 102b (WTRU 102a)" is used to reflect the separate performance by the WTRUs. Also for convenience and simplicity of exposition in the description that follows, the terms "WTRU 102a" refer to one of the two WTRUs and the terms "WTRU 102b" refer to the other WTRU.

The WTRU application layer (e.g., WTRU application 103) of the WTRU 102a may initiate a service that uses a PC5 unicast communication (402). The WTRU 102a may establish a secure layer-2 link over the PC5 interface with the WTRU 102b (404). In an embodiment, the WTRU 102a may send a direct communication request message to the WTRU 102b. The direct communication request message may be sent to trigger mutual authentication. The WTRU 102b may receive the direct communication request message and may initiate a procedure for mutual authentication. Successful completion of the mutual authentication procedure completes the establishment of the secure layer-2 link over PC5.

The WTRU 102a (WTRU 102b) may use the keep alive or other functionality of the PC5 signaling protocol entity 312a to maintain the layer-2 link over PC5 (406). The WTRU 102a (WTRU 102b) may determine that the PC5 sidelink is not or no longer viable for communications with the WTRU 102b (WTRU 102a) using the keep alive or other functionality of the PC5 signaling protocol entity 312a (e.g., as a proxy for detecting that the WTRUs are not within proximity/ProSe communication range of each other) (408).

The SL-EEF 314 of the WTRU 102a (WTRU 102b) may generate a PC5 notification report using PC5 inviability information and the sidelink identifiers (410). The SL-EEF 314, for example, may concatenate or otherwise combine the PC5 inviability information and the sidelink identifiers to form the PC5 notification report.

The SL-EEF 314 may provide the PC5 notification report to NAS entity 216 for transmission to AMF 182 (412). The NAS entity 216 may invoke the NAS protocol to convey the PC5 notification report to the AMF 182 using an N1 interface. The NAS entity may convey the PC5 notification report to the AMF 182 within a NAS message container of a Service Request message (414). Sending the NAS message to the network while the WTRU 102a (WTRU 102b) is in RRC_IDLE may cause the WTRU to initiate an RRC connection (and enter RRC_CONNECTED mode).

The WTRU 102a (WTRU 102b) may listen for a response to the Service Request message from the AMF 182 (416). The response may be, for example, a Service Reject message or a Service Accept message (or another like-type message).

If the response to the Service Request message is a Service Reject message, then the WTRU 102a (WTRU 102b) may proceed to initiate a layer-2 link release over PC5 and may conclude the PC5 service continuity procedure. Under these circumstances the PC5 service continuity operation may be deemed to be unsuccessful. If the response to the Service Request message is a Service Accept message, the WTRU 102a (WTRU 102b) may transition from connection management state CM-IDLE to CM-CONNECTED (418). While in CM-CONNECTED state, the WTRU 102a (WTRU 102b) may initiate a UE Requested PDU Session Establishment Request and may include QoS rules/packet filter set(s) of the sidelink identifier(s) (420).

The WTRU 102a (WTRU 102b) may listen to the network for a response to the UE Requested PDU Session Establishment Request (422). The response may be, for example, a PDU Session Establishment Accept message or a PDU Session Establishment Reject message (or another like-type message). If the response to the UE Requested PDU Session Establishment Request is a PDU Session Establishment Reject message, then the WTRU 102a (WTRU 102b) may proceed to initiate the layer-2 link release over PC5 (424) and may conclude the PC5 Service continuity procedure. Under these circumstances the PC5 service continuity operation may be deemed to be unsuccessful. Alternatively, if the response to the UE Requested PDU Session Establishment Request is a PDU Session Establishment Accept message, then the application layer of the WTRU 102a may send ProSe packets to the ProSe application server using the newly established PDU session (426). The WTRU 102a (WTRU 102b) may initiate a layer-2 link release over PC5 (424) and may conclude the PC5 service continuity procedure. Under these circumstances the PC5 service continuity operation may be deemed to be successful.

The PDU Session Establishment Request message and/or the PDU Session Modification Request message may include one or more IEs configured to carry any of the requested packet filters (QoS rules) and the requested QoS flow descriptions. The packet filters (QoS rules) associated the sidelink identifier(s) may be carried by the PDU Session Establishment(Modification) Request message in various ways (e.g. in various IEs of the message). For example, the packet filters (QoS rules) may be carried in an extended protocol configuration options IE of the PDU Session Establishment(Modification) Request message. Alternatively, the packet filters (QoS rules) may be carried in one or more other IEs (e.g., in extensions) of the PDU Session Establishment(Modification) Request message, such as in any of a "Requested QoS rules" IE and a "Requested QoS flow descriptions" IE.

Figures 5, 6:
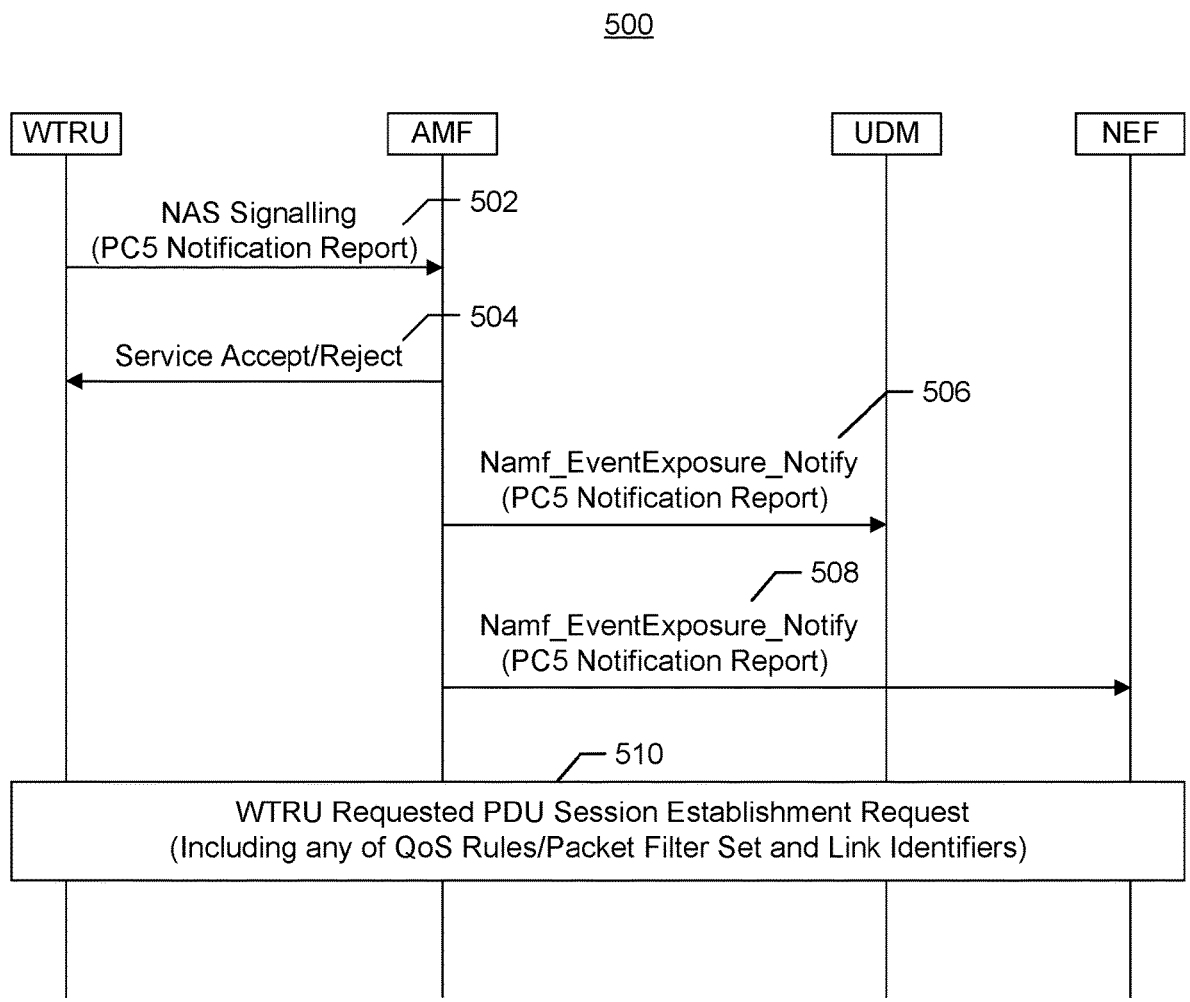
FIG. 5 illustrates a message exchange in connection with notification reporting.
FIG. 6 illustrates an example non-access stratum (NAS) message.

FIG. 5 illustrates a message exchange 500 in connection with PC5 notification reporting. The PC5 notification report may be conveyed to the AMF 182 using a WTRU activity notification procedure. For convenience and simplicity of exposition, the message exchange 500 is described with reference to the WTRU architecture 200 (FIG. 2), the PC5 unicast links (FIG. 2D) and the architecture of the communications system 100 (FIG. 1). The message exchange may be carried out using different architectures as well.

Further, the message exchange 500 may be suitable for use with, or in connection with (e.g., to support), carrying out service continuity in connection with two WTRUs engaged in sidelink communications. As one of ordinary skill would recognize, the message exchange 500 may be separately carried out by both of the two WTRUs along with corresponding AMFs, NEFs and UDMs. However, for convenience and simplicity of exposition, the nomenclature "WTRU", "AMF", "NEF" and "UDM" (i.e., singular forms) are used in the description that follows.

Referring to FIG. 5, a WTRU 102, while in CM-IDLE, may send a PC5 notification report to an AMF 182 in a NAS message container of a Service Request message (502). In an embodiment, the PC5 notification report may be carried in one or more IEs of the NAS message container, such as a NAS message container contents IE (e.g., as depicted in an example NAS message container shown in FIG. 6.

Since the WTRU 102 may send the Service Request message while it is in CM-IDLE, the IEs thereof may be sent as non-cleartext IEs due to the Service Request message being an Initial NAS message. The WTRU 102 in CM IDLE state may use the service request procedure to request establishment of a secure connection to the AMF 182. Alternatively, the network (e.g., 5GC) may use the service request procedure to request the establishment of the secure connection among the WTRU 102, the AMF 182 and an application server. The service request procedure may be used by the WTRU 102 in CM-IDLE and/or in CM-CONNECTED to activate a user plane connection for an established PDU Session.

The AMF 182 may send a Service Accept message to the WTRU 102 (504) to acknowledge acceptance of the Service Request by the network. Alternatively, the AMF 182 may send a Service Reject message to the WTRU 102 (504), e.g., if the Service Request cannot be accepted by network.

A PC5 notification event may be exposed by the AMF 182 (e.g., in addition to other events exposed) using a Namf_E- ventExposure service. In an embodiment, the AMF 182 may initiate a Namf_EventExposure_Notify service operation message to a UDM 191 (506). The UDM 191 may receive the Namf_EventExposure_Notify service operation message for the WTRU 102 (506) and may trigger and/or send appropriate notifications to the NEF 187 (not shown).

Alternatively, the AMF 182 may initiate a Namf_EventExposure_Notify service operation message to (e.g., directly to) a NEF 187 (508). The AMF 182 may do so, for example, if the UDM 191 indicates that the notification is to be sent directly to the NEF 187 and/or if the AMF 182 had been informed by the NEF 187 that the NEF 187 is to receive notifications directly from the AMF 182. The NEF 187, for example, may send a Namf_EventExposure_Subscribe service operation message to so inform the AMF 182.

The WTRU 102 may transition from CM-IDLE to CM-CONNECTED after receiving the Service Accept message from the AMF 182. While in CM-CONNECTED state, the WTRU 102 may initiate a WTRU Requested PDU Session Establishment Request message and include therein the QoS rules/packet filter set(s) associated with the sidelink identifier(s) (510).

Figure 7:
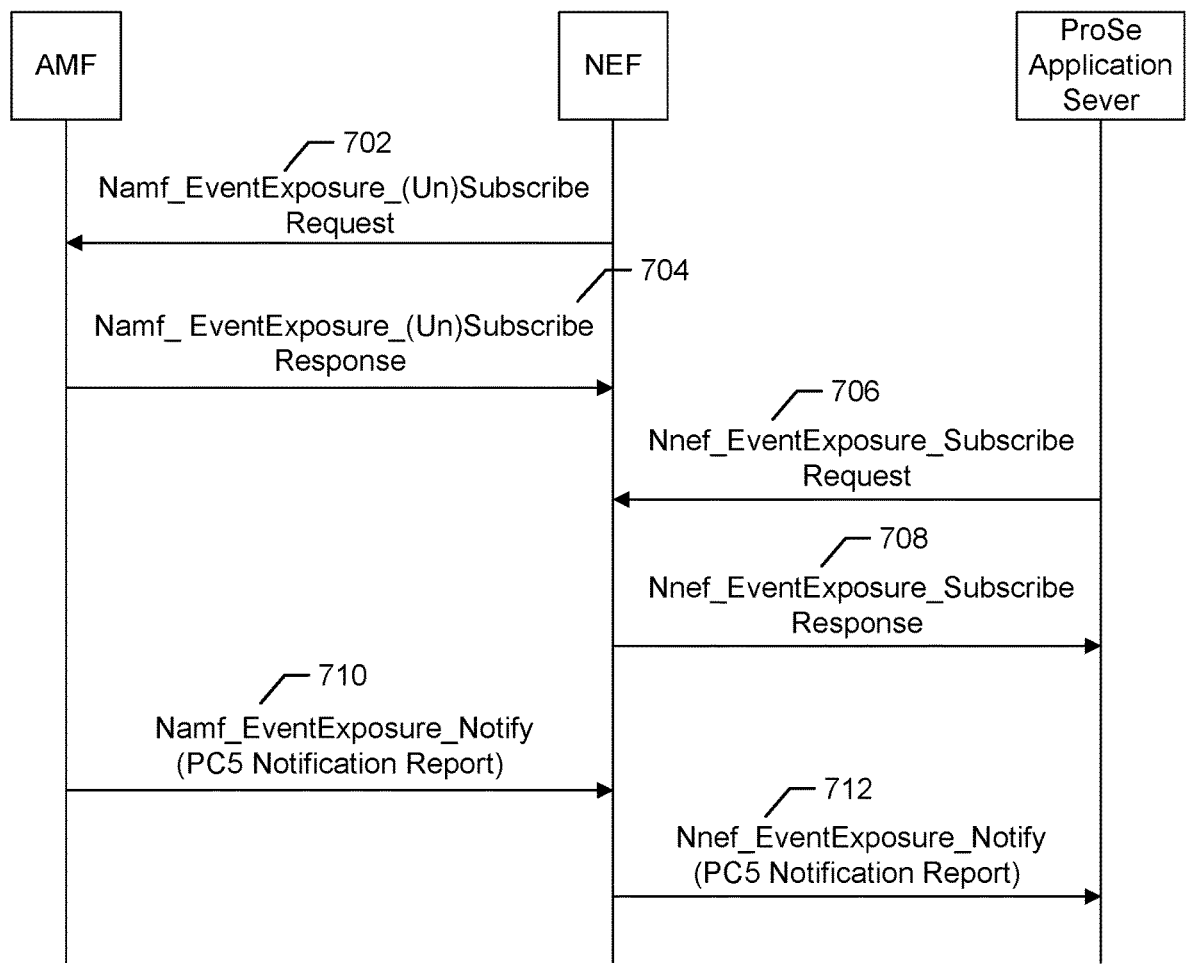
FIG. 7 illustrates a message exchange in connection with subscription and notify operations for an exposed notification event.

FIG. 7 illustrates a message exchange 700 in connection with subscription and notify operations for a PC5 notification event. The PC5 notification event may be exposed by the AMF 182 (e.g., in addition to other events exposed the AMF 182), e.g., using a Namf_EventExposure service. Pursuant to the message exchange 700, a ProSe application server 189 may receive one or more notifications of the PC5 notification event. For convenience and simplicity of exposition, the message exchange 700 is described with reference to the WTRU architecture 200 (FIG. 2), the PC5 unicast links (FIG. 2D) and the architecture of the communications system 100 (FIG. 1). The message exchange may be carried out using different architectures as well.

Further, the message exchange 700 may be suitable for use with, or in connection with (e.g., to support), carrying out service continuity in connection with two WTRUs engaged in sidelink communications. As one of ordinary skill would recognize, some of the message exchange 700 may be separately carried out by a NEF and an AMF associated to each of the two WTRUs engaged in sidelink communications. However, for convenience and simplicity of exposition, the nomenclature "AMF" and "NEF" (i.e., singular forms) are used in the description that follows.

Referring to FIG. 7, a NEF 187 may send to an AMF 182 a request to subscribe to a PC5 notification event (e.g., in addition to other events exposed by the AMF 182) (702), e.g., using a Namf_EventExposure_Subscribe request. The NEF 187 may include an identification of the PC5 notification event in the Namf_EventExposure_Subscribe request. The NEF 187 may provide an associated notification endpoint of the PC5 notification event. The associated endpoint may be the NEF 187 itself. Alternatively, the associated endpoint may be the ProSe application server 189. The AMF 182 may authorize the reporting event subscription and may record the association of the event trigger and the requester identity.

The AMF 182 may acknowledge the execution of Namf_EventExposure_Subscribe (704). The ProSe application server 189 may send to the NEF 187 a request to subscribe to the PC5 notification event (e.g., in addition to other events exposed by the AMF 182 and/or the NEF 187) (706), e.g., using a Nnef_EventExposure_Subscribe request. The ProSe application server 189 may include the identification of the PC5 notification event in the Nnef_EventExposure_Subscribe request. The ProSe application server 189 may provide an associated notification endpoint of the PC5 notification event along with the request (e.g., in the Nnef_EventExposure_Subscribe request). The associated endpoint may be the ProSe application server 189 and/or the NEF 187, for example. The NEF 187 may authorize the reporting event subscription and may record an association of the event trigger and requester identity, such as, e.g., an identifier of (associated with, assigned to, etc.) the ProSe application server 189.

The NEF 187 may acknowledge the execution of Nnef_EventExposure_Subscribe (708). The AMF 182 may detect that the monitored PC5 notification event has occurred and may send an event report (710), e.g., using a Namf_EventExposure_Notify message, to the notification endpoint. The notification endpoint may be the NEF 187 and/or the ProSe application server 189, for example. The NEF 187 may receive the PC5 notification event report from the AMF 182 and may send the PC5 notification event report to the ProSe application server 189 (712), e.g., using a Nnef_EventExposure_Notify message.

In an embodiment, the ProSe application server 189 may receive a PC5 notification report from each of two (or more) WTRUs. In an embodiment, the ProSe application server 189 may receive the PC5 notification reports and may extract the respective unicast link profiles identified by the PC5 link identifier.

In an embodiment, the ProSe application server 189 may create and may maintain mappings between the two (or more) WTRUs based at least in part on the unicast link profiles. The ProSe application server 189 may use a table (data structure) to create and/or maintain mappings between the two (or more) WTRUs. An example of the table ("PC5 notification mapping table") may be Table 2 below in which entries in the first two columns are populated based on (e.g., using identifiers provided in) the PC5 notification reports for two WTRUs (listed as WTRU 102a and WTRU 102b).

TABLE 2

PC5 Notification Mapping

| WTRU 102a Application Layer ID | WTRU 102b Application Layer ID | WTRU 102a Source Address | WTRU 102b Source Address |
|---|---|---|---|
| A | B | 1 | 2 |
| C | D | 3 | 4 |

In an embodiment, following successful establishment of a PDU session for the WTRU 102a, the ProSe application server 189 may receive ProSe packets from WTRU 102a. The ProSe application server 189 may inspect one or more of the ProSe packets to identify (discover) associated WTRU application layer identifiers and routable source addresses. The ProSe application server 189 may populate the discovered source address of the WTRU 102a into the corresponding entry of the PC5 notification mapping table (e.g., Table 2), if not previously populated. The ProSe application server 189 may forward the ProSe packets to WTRU 102b if the PC5 notification mapping table (e.g., Table 2) includes an entry populated with a source address of the WTRU 102b. The ProSe application server 189 may buffer the ProSe packets if the PC5 notification mapping table lacks sufficient information to forward such packets. In various embodiments, the ProSe application server 189 may send to the WTRUs some or all of the mappings of the constructed PC5 notification mapping table (e.g., the mappings corresponding to the WTRUs). The WTRUs may receive the mappings and may send subsequent ProSe packets (addressed) using the routable destination addresses.

In an embodiment, following successful PDU session establishment for the WTRU 102b, the ProSe application server 189 may receive ProSe packets from the WTRU 102b. The ProSe application server 189 may inspect one or more of the ProSe packets to identify (discover) associated WTRU application layer identifiers and routable source addresses.

The ProSe application server 189 may populate the discovered source address of the WTRU 102b into the corresponding entry of the PC5 notification mapping table (e.g., Table 2), if not previously populated. The ProSe application server 189 may forward the ProSe packets to the WTRU 102a if the PC5 notification mapping table (e.g., Table 2) includes an entry populated with the source address of the WTRU 102a. The ProSe application server 189 may buffer the ProSe packets if the PC5 notification mapping table lacks sufficient information to forward such packets. In various embodiments, the ProSe application server 189 may send to the WTRUs some or all of the mappings of the constructed PC5 notification mapping table (e.g., the mappings corresponding to the WTRUs). The WTRUs may receive the mappings and may send subsequent ProSe packets (addressed) using routable destination addresses.

Figure 8:
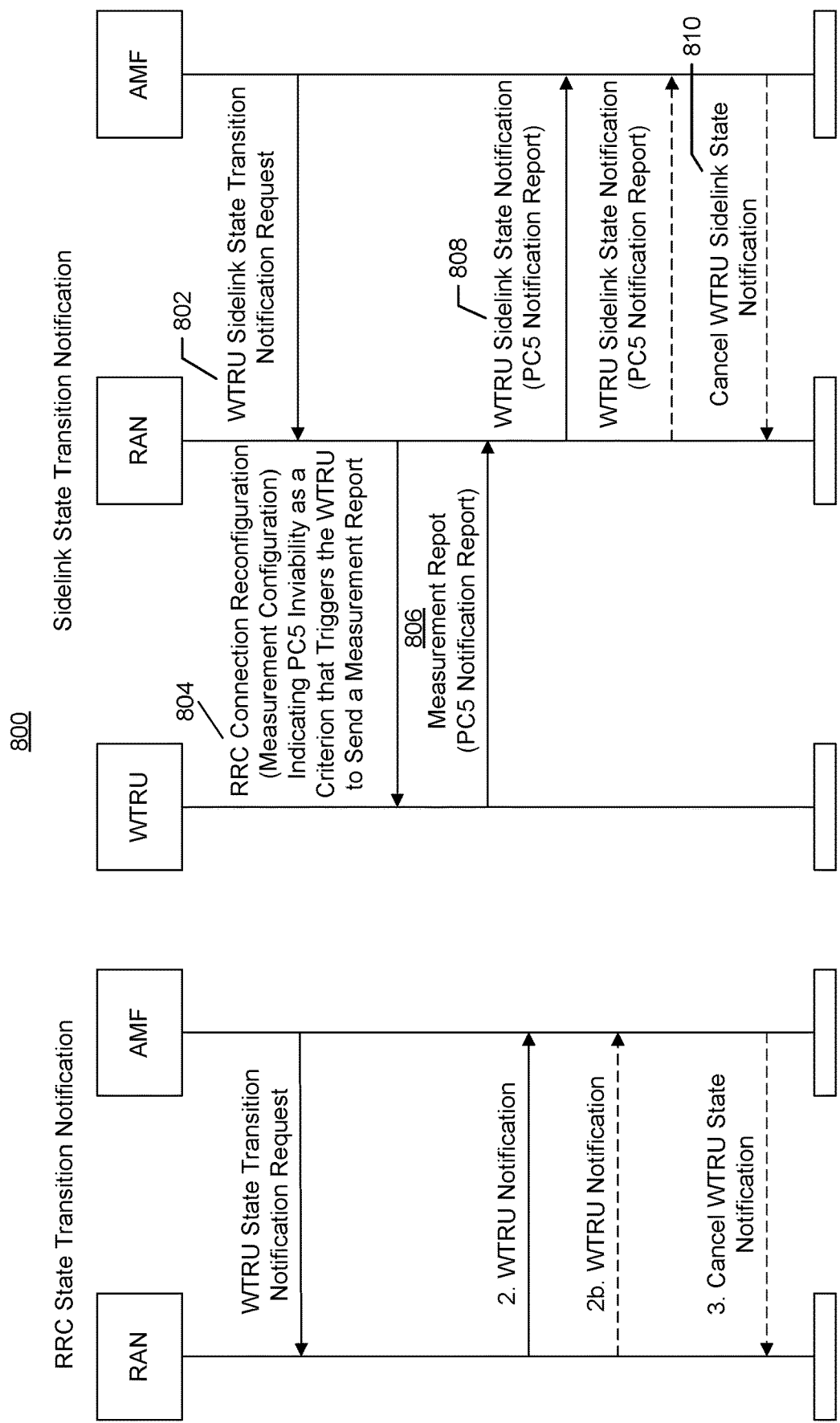
FIG. 8 is a message diagram illustrating an example sidelink state transition notification procedure.

FIG. 8 is a message diagram illustrating an example sidelink state transition notification procedure 800. The sidelink state transition notification procedure 800 may be suitable for scenarios in which two WTRUs engaged in sidelink transmission are in connection management state CONNECTED and RRC_CONNECTED with no active PDU sessions. For convenience and simplicity of exposition, the sidelink state transition notification procedure is described with reference to the WTRU architecture 200 (FIG. 2), the PC5 unicast links (FIG. 2D) and the architecture of the communications system 100 (FIG. 1). The sidelink state transition notification procedure may be carried out using different architectures as well.

Further, the sidelink state transition notification procedure 800 may be suitable for use with, or in connection with (e.g., to support), carrying out service continuity in connection with two WTRUs engaged in sidelink communications. As one of ordinary skill would recognize, the sidelink state transition notification procedure 800 may be separately carried out by carried out by both of the two WTRUs along with corresponding RANs and AMFs. However, for convenience and simplicity of exposition, the nomenclature "WTRU", "RAN" and "AMF" (i.e., singular forms) are used in the description that follows.

Referring to FIG. 8, an AMF 182 may request a RAN 113 to report sidelink state information when a target WTRU (e.g., WTRU 102a) is in CM-CONNECTED state (802). The reporting of sidelink state transitions requested by the AMF 182 may be on a per WTRU basis.

The AMF 182 may send a WTRU Sidelink State Transition Notification Request to the RAN 113 (802). The WTRU Sidelink State Transition Notification Request message may identify the WTRU(s) for which notification(s) are requested. The WTRU Sidelink State Transition Notification Request may indicate a notification behavior of subsequent sidelink state transitions as the WTRUs move in and out of the ProSe communication range.

The RAN 113 may receive the UE Sidelink State Transition Notification Request and may configure/update a sidelink measurement configuration to include PC5 inviability information (e.g., a PC5 keep-alive timeout, etc.) as a criterion for triggering the WTRU to send a sidelink measurement report (804). A V2X/ProSe layer may in the WTRU may inform the AS layer of the PC5 inviability information. Alternatively, the RAN 113 may configure a threshold for RRC measurements of the PC5 link quality and the WTRU may send an RRC measurement when the PC5 quality goes below the set threshold. The WTRU, while in CM-CONNECTED and RRC_CONNECTED, may send to the RAN 113 an RRC MeasurementReport message carrying the PC5 notification report (806).

The RAN may send to the AMF 182 a WTRU sidelink state notification message that may include the PC5 notification report (808). The WTRU Sidelink State Transition Notification Request may specify a notification behavior. For example, the WTRU sidelink state notification message may be sent as a one-off notification, if specified as the notification behavior in the UE Sidelink State Transition Notification Request. Alternatively, the WTRU sidelink state notification message may be sent every time the sidelink state changes, if specified as the notification behavior in the UE Sidelink State Transition Notification Request. The AMF 182 may send a Cancel UE Sidelink State Notification message (810) to inform the RAN 113 that it should terminate notifications for a given WTRU.

Figure 9:
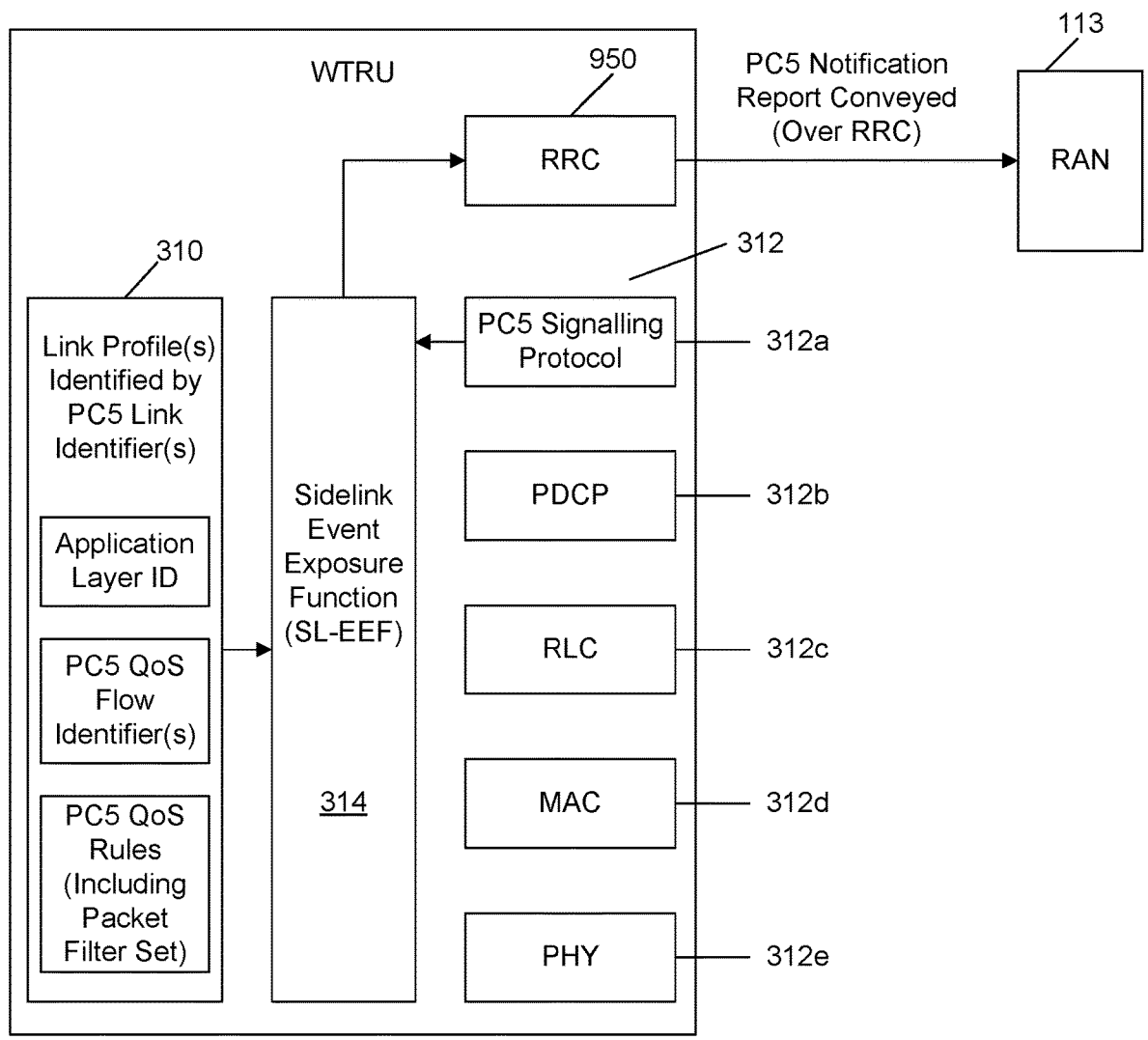
FIG. 9 is a block diagram illustrating an example WTRU architecture according to an embodiment.

FIG. 9 is a block diagram illustrating an example WTRU architecture 900 according to an embodiment. The WTRU architecture 900 may be suitable for generating a PC5 notification report and/or conveying a PC5 notification report to an AMF, such as AMF 182 (FIG. 1). The WTRU architecture 900 is similar to WTRU architecture 300 of FIG. 3, except that the SL-EEF 314 may conveys the PC5 notification report to a RAN 113 via an RRC entity 950 and/or invokes a RRC protocol to convey the new PC5 notification report to the RAN 113.

Figure 10:
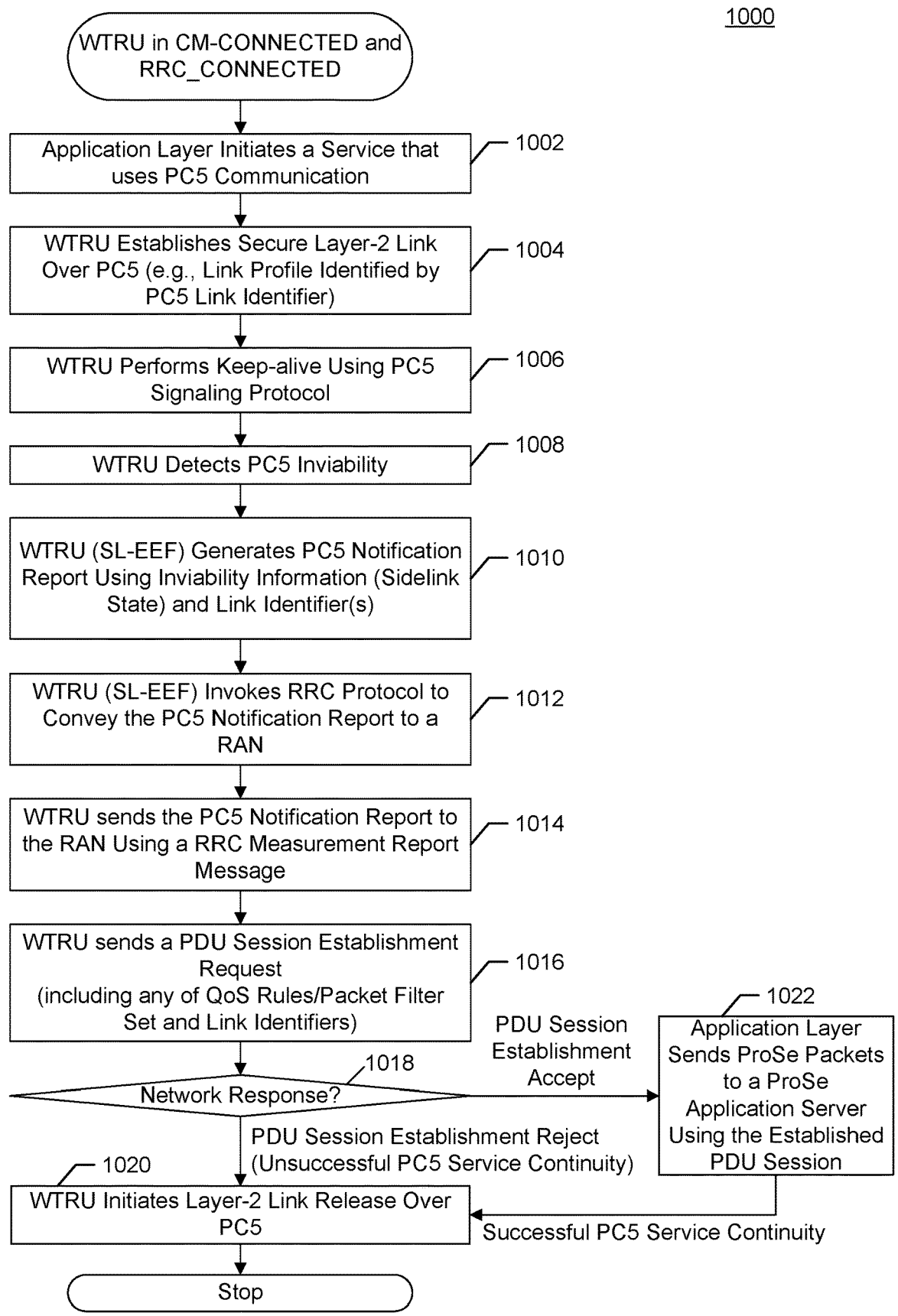
FIG. 10 is a flow chart illustrating an example flow for carrying out service continuity according to various embodiments.

FIG. 10 is a flow chart illustrating an example flow 1000 for carrying out service continuity according to various embodiments. The flow 1000 may be suitable for carrying out service continuity in which two WTRUs engaged in sidelink transmission are in connection management state CM-CONNECTED and RRC_CONNECTED with no active PDU sessions. For convenience and simplicity of exposition, the flow 1000 is described with reference to the WTRU architecture 900 (FIG. 9), the PC5 unicast links (FIG. 2D) and the architecture of the communications system 100 (FIG. 1). The flow 1000 may be carried out using different architectures as well.

Further, as one of ordinary skill would recognize, some of the flow 1000 may be separately carried out by both of the two WTRUs. And as such, for convenience and simplicity of exposition in the description that follows, the nomenclature "WTRU 102*a* (WTRU 102*b*)" and "WTRU 102*b* (WTRU 102*a*)" is used to reflect the separate performance by the WTRUs. Also for convenience and simplicity of exposition in the description that follows, the nomenclature "WTRU 102*a*" refer to one of the two WTRUs and the terms "WTRU 102*b*" refer to the other WTRU.

The WTRU application layer (e.g., WTRU application 103) of a WTRU 102*a* may initiate a service that uses a PC5 unicast communication (1002). The WTRU 102*a* may establish a secure layer-2 link over the PC5 interface with the WTRU 102*b* (1004). In an embodiment, the WTRU 102*a* may send a direct communication request message to the WTRU 102*b*. The direct communication request message may be sent to trigger mutual authentication. The WTRU 102*b* may receive the direct communication request message and may initiate a procedure for mutual authentication. Successful completion of the mutual authentication procedure completes the establishment of the secure layer-2 link over PC5.

The WTRU 102*a* (WTRU 102*b*) may use the keep alive or other functionality of the PC5 signaling protocol entity 312*a* to maintain the layer-2 link over PC5 (1006). The WTRU 102*a* (WTRU 102*b*) may determine that the PC5 sidelink is not or no longer for communications with the WTRU 102*b* (WTRU 102*a*) using the keep alive or other functionality of the PC5 signaling protocol entity 312*a* (e.g., as a proxy for detecting that the WTRUs are not within proximity/ProSe communication range of each other) (1008).

The SL-EEF 314 of the WTRU 102*a* (WTRU 102*b*) may generate a PC5 notification report using PC5 inviability information and the sidelink identifiers (1010). The SL-EEF 314, for example, may concatenate or otherwise combine the PC5 inviability information and the sidelink identifiers to form the PC5 notification report.

The SL-EEF 314 may provide the PC5 notification report to RRC entity 902 (1012). The RRC entity 902 may invoke the RRC protocol to convey the PC5 notification report to the RAN 113 (1014). In an embodiment, a V2X/ProSe layer in the WTRU 102*a* (WTRU 102*b*) may invoke the RRC protocol to convey the PC5 notification report. The RRC entity 902 of the WTRU 102*a* (WTRU 102*b*) may send the PC5 notification report within an RRC MeasurementReport message.

The WTRU 102*a* (WTRU 102*b*) may initiate a WTRU Requested PDU Session Establishment Request and may include QoS rules/packet filter set(s) of the sidelink identifier(s) (1016).

The WTRU 102*a* (WTRU 102*b*) may listen to the network for a response to the WTRU Requested PDU Session Establishment Request (1018). The response may be, for example, a PDU Session Establishment Accept message or a PDU Session Establishment Reject message (or another like-type message). If the response to the WTRU Requested PDU Session Establishment Request is a PDU Session Establishment Reject message, then the WTRU 102*a* (WTRU 102*b*) may proceed to initiate the layer-2 link release over PC5 (1018) and may conclude the PC5 Service continuity procedure. Under these circumstances the PC5 service continuity operation may be deemed to be unsuccessful.

Alternatively, if the response to the WTRU Requested PDU Session Establishment Request is a PDU Session Establishment Accept message, then the application layer may send ProSe packets to the ProSe application server using the newly established PDU session (1020). The WTRU 102*a* (WTRU 102*b*) may initiate a layer-2 link release over PC5 (1022) and may concludes the PC5 Service continuity procedure. Under these circumstances the PC5 service continuity operation may be deemed to be successful.

The PDU Session Establishment Request message and/or the PDU Session Modification Request message may include one or more IEs configured to carry any of the requested packet filters (QoS rules) and the requested QoS flow descriptions. The packet filters (QoS rules) associated with the sidelink identifier(s) may be carried by the PDU Session Establishment(Modification) Request message in various ways (e.g. in various IEs of the message). For example, the packet filters (QoS rules) may be carried in an extended protocol configuration options IE of the PDU Session Establishment(Modification) Request message. Alternatively, the packet filters (QoS rules) may be carried in one or more other IEs (e.g., in extensions) of the PDU Session Establishment(Modification) Request message, such as in any of a "Requested QoS rules" IE and "Requested QoS flow descriptions" IE.

Figure 11:
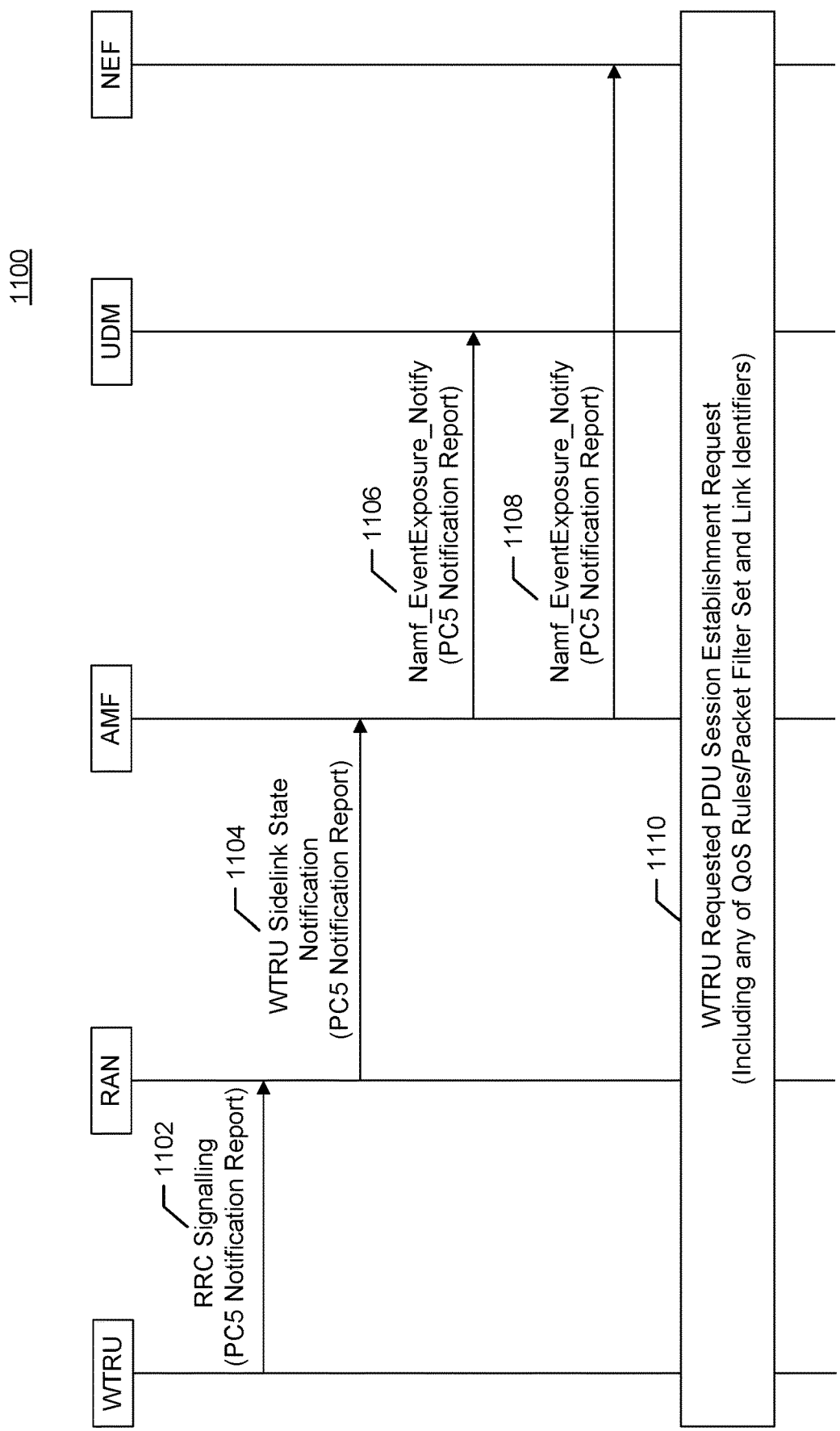
FIG. 11 illustrates a message exchange in connection with notification reporting.

FIG. 11 illustrates a message exchange 1100 in connection with PC5 notification reporting. The PC5 notification report may be conveyed to the AMF 182 via the RAN 113 using a WTRU activity notification procedure. For convenience and simplicity of exposition, the message exchange is described with reference to the WTRU architecture 900 (FIG. 9), the PC5 unicast links (FIG. 2D) and the architecture of the communications system 100 (FIG. 1). The message exchange may be carried out using different architectures as well.

Further, the message exchange 1100 may be suitable for use with, or in connection with (e.g., to support), carrying out service continuity in connection with two WTRUs engaged in sidelink communications. As one of ordinary skill would recognize, the message exchange 1100 may be separately carried out by both of the two WTRUs along with corresponding RANs, AMFs, UDMs and NEFs. However, for convenience and simplicity of exposition, the nomenclature "WTRU", "RAN", "AMF", "UDM" and "NEF" (i.e., singular forms) are used in the description that follows.

Referring to FIG. 11, a WTRU 102, while in CM-CONNECTED and RRC_CONNECTED state, may send a PC5 notification report to the RAN 113 in an RRC MeasurementReport message (1102). The RAN 113 may receive the PC5 notification report in the RRC MeasurementReport and may send to the AMF 182 a WTRU Sidelink State Notification message that includes new PC5 notification report (1104).

A PC5 notification event may be exposed by the AMF 182 (e.g., in addition to other events exposed) using a Namf_EventExposure_service. In an embodiment, the AMF 182 may initiate a Namf_EventExposure_Notify service operation message to a UDM 191 (1106). The UDM 191 may receive the Namf_EventExposure_Notify service operation message for the WTRU 102a (506) and may trigger and/or send appropriate notifications to the NEF 187 (not shown).

Alternatively, the AMF 182 may initiate a Namf_EventExposure_Notify service operation message to (e.g., directly to) a NEF 187 (1108). The AMF 182 may do so, for example, if the UDM 191 indicates that the notification is to be sent directly to the NEF 187 and/or if the AMF 182 had been informed by the NEF 187 that the NEF 187 is to receive notifications directly from the AMF 182. The NEF 187, for example, may send a Namf_EventExposure_Subscribe service operation message to so inform the AMF 182. The WTRU 102 may initiate a WTRU Requested PDU Session Establishment Request and may include therein the QoS rules/packet filter set(s) associated with the sidelink identifier(s) (1110).

Figure 12:
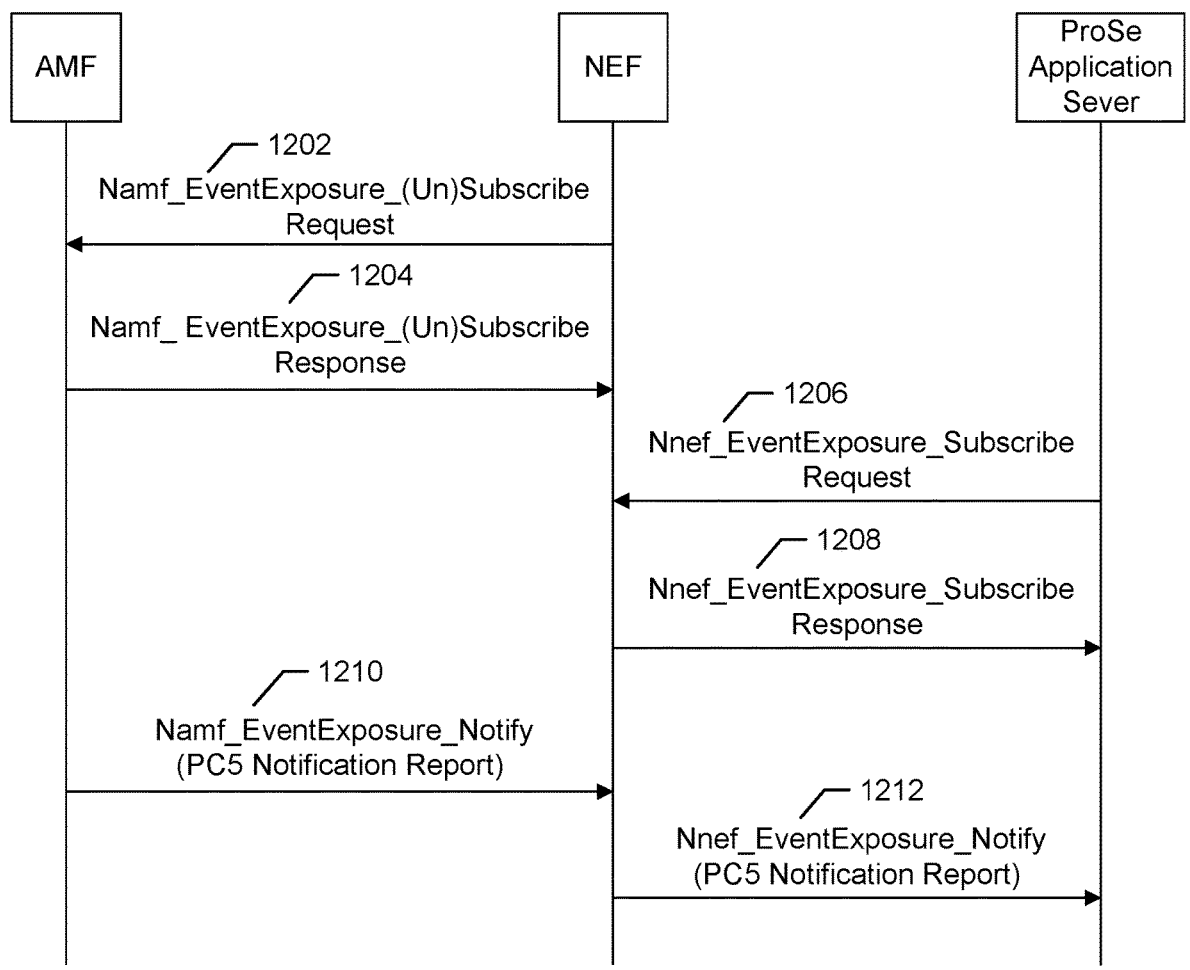
FIG. 12 illustrates a message exchange in connection with subscription and notify operations for an exposed notification event.

FIG. 12 illustrates a message exchange 1200 in connection with subscription and notify operations for a PC5 notification event. The PC5 notification event may be exposed by the AMF 182 (e.g., in addition to other events exposed by the AMF 182), e.g., using a Namf_EventExposure service. Pursuant to the message exchange, a ProSe application server 189 may subscribe to a NEF 187 to receive notifications of the PC5 notification event. For convenience and simplicity of exposition, the message exchange 1200 is described with reference to the WTRU architecture 900 (FIG. 9), the PC5 unicast links (FIG. 2D) and the architecture of the communications system 100 (FIG. 1). The message exchange may be carried out using different architectures as well.

Further, the message exchange 1200 may be suitable for use with, or in connection with (e.g., to support), carrying out service continuity in connection with two WTRUs engaged in sidelink communications. As one of ordinary skill would recognize, some of the message exchange 1200 may be separately carried out by a NEF and an AMF associated to each of the two WTRUs engaged in sidelink communications. However, for convenience and simplicity of exposition, the nomenclature "AMF" and "NEF" (i.e., singular forms) are used in the description that follows.

Referring to FIG. 12, the NEF 187 may send to the AMF 182 a request to subscribe to a PC5 notification event (e.g., in addition to other events exposed by the AMF 182) (1202), e.g., using a Namf_EventExposure_Subscribe request. The NEF 187 may include an identification of the PC5 notification event in the Namf_EventExposure_Subscribe request. The NEF 187 may provide an associated notification endpoint of the PC5 notification event along with the request (e.g., in the Nnef_EventExposure_Subscribe request). The associated endpoint may be the NEF 187. Alternatively, the associated endpoint may be the ProSe application server 189. The AMF 182 may authorize the reporting event subscription and may record the association of the event trigger and requester identity, such as, e.g., an identifier of (associated with, assigned to, etc.) the ProSe application server 189.

The AMF 182 may acknowledge the execution of Namf_EventExposure_Subscribe (1204). The ProSe application server 189 may send a request to subscribe to a set of Event ID(s) in the NEF 187 (1206), e.g., using a Nnef_EventExposure_Subscribe request. The ProSe application server 189 may include the identification ID of the PC5 notification event in the Nnef_EventExposure_Subscribe request. The ProSe application server 189 may provide an associated notification endpoint of the PC5 notification event. The associated endpoint may be the ProSe application server 189 and/or the ProSe application server 189, for example. The NEF 187 may authorize the reporting event subscription and may record an association of the event trigger and requester identity, such as, e.g., an identifier of (associated with, assigned to, etc.) the ProSe application server 189.

The NEF 187 may acknowledge the execution of Nnef_EventExposure_Subscribe (1208). The AMF 182 may detect that the monitored PC5 notification event has occurred and may sends an event report (1210), e.g., using a Namf_EventExposure_Notify message, to the notification endpoint. The notification endpoint may be the NEF 187 and/or the ProSe application server 189, for example. The NEF 187 may receive the PC5 notification event report from the AMF 182 and may send the PC5 notification event report to the ProSe application server 189 (1212), e.g., using a Nnef_EventExposure_Notify message.

In an embodiment, the ProSe application server may receive a PC5 notification report from two or more of the WTRUs 102. In an embodiment, the ProSe application server 189 may receive the PC5 notification reports and may extract the respective unicast link profiles identified by the PC5 link identifier.

In an embodiment, the ProSe application server 189 may create and may maintain mappings between the two (or more) WTRUs based at least in part on the unicast link profiles. The ProSe application server 189 may use a PC5 notification mapping table to create and/or maintain mappings between the two (or more) WTRUs. The PC5 notification mapping table may be Table 2 below in which entries in the first two columns are populated based on (e.g., using identifiers provided in) the PC5 notification reports for two WTRUs (listed as WTRU 102a and WTRU 102b).

In an embodiment, following successful establishment of a PDU session for the WTRU 102a, the ProSe application server 189 may receive ProSe packets from WTRU 102a. The ProSe application server 189 may inspect one or more the ProSe packets to identify (discover) associated WTRU application layer identifiers and routable source addresses. The ProSe application server 189 may populate the discovered source address of the WTRU 102a into the corresponding entry of the PC5 Notification Mapping table (e.g., Table 2), if not previously populated. The ProSe application server 189 may forward the ProSe packets to the WTRU 102b if the PC5 Notification Mapping table (e.g., Table 2) includes an entry populated with a source address of the WTRU 102b. The ProSe application server 189 may buffer the ProSe packets if the mapping table lacks sufficient information to forward such packets. In various embodiments, the ProSe application server 189 may send to the WTRUs some or all of the mappings of the constructed mapping table (e.g., the mappings corresponding to the WTRUs). The WTRUs may receive the mappings and may send subsequent ProSe packets (addressed) using the routable destination addresses.

In an embodiment, following successful PDU session establishment for the WTRU 102b, the ProSe application server 189 may receive ProSe packets from the WTRU 102b. The ProSe application server 189 may inspects one or more of the ProSe packets to identify (discover) associated WTRU application layer identifiers and routable source addresses.

The ProSe application server 189 may populate the discovered source address of the WTRU 102b into the corresponding entry of the PC5 Notification Mapping table (e.g., Table 2), if not previously populated. The ProSe application server 189 may forward the ProSe packets to the WTRU 102a if the PC5 Notification Mapping table (e.g., Table 2) includes an entry populated with the source address of the WTRU 102a. The ProSe application server 189 may buffer the ProSe packets if the mapping table lacks sufficient information to forward such packets. In various embodiments, the ProSe application server 189 may send to the WTRUs some or all of the mappings of the constructed mapping table (e.g., the mappings corresponding to the WTRUs). The WTRUs may receive the mappings and may send subsequent ProSe packets (addressed) using the routable destination addresses.

Figure 13:
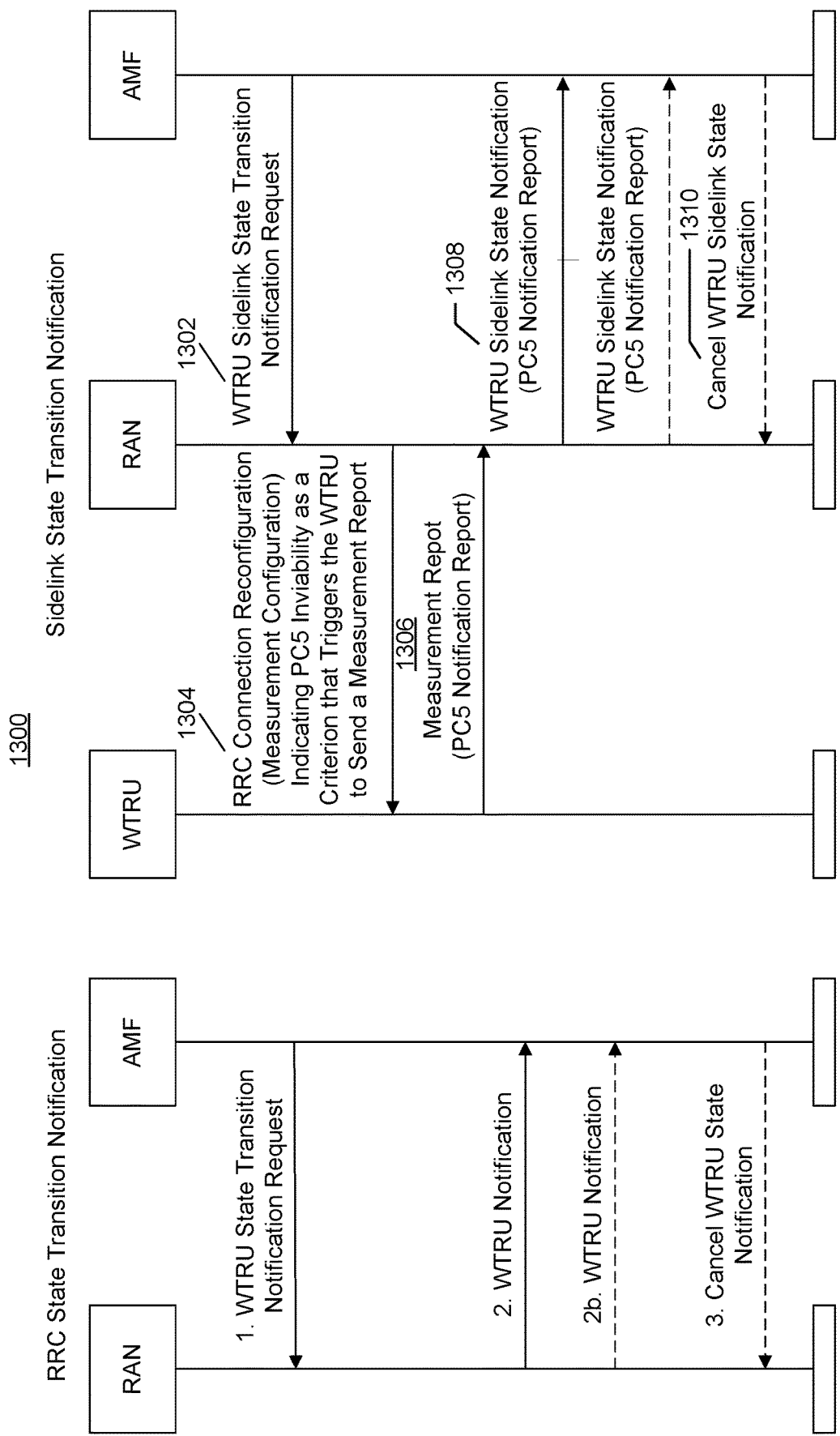
FIG. 13 is a message diagram illustrating an example sidelink state transition notification procedure.

FIG. 13 is a message diagram illustrating an example sidelink state transition notification procedure 1300. The sidelink state transition notification procedure 1300 may be suitable for scenarios in which two WTRUs engaged in sidelink transmission are in connection management state CONNECTED and RRC_CONNECTED with one or more active PDU sessions. For convenience and simplicity of exposition, the sidelink state transition notification procedure is described with reference to the WTRU architecture 900 (FIG. 9), the PC5 unicast links (FIG. 2C) and the architecture of the communications system 100 (FIG. 1). The sidelink state transition notification procedure may be carried out using different architectures as well.

Further, the sidelink state transition notification procedure 1300 may be suitable for use with, or in connection with (e.g., to support), carrying out service continuity in connection with two WTRUs engaged in sidelink communications. As one of ordinary skill would recognize, the sidelink state transition notification procedure 1300 may be separately carried out by carried out by both of the two WTRUs along with corresponding RANs and AMFs. However, for convenience and simplicity of exposition, the nomenclature "WTRU", "RAN" and "AMF" (i.e., singular forms) are used in the description that follows.

Referring to FIG. 13, an AMF 182 may request a RAN 113 to report sidelink state information when a target WTRU (e.g., WTRU 102a) is in CM-CONNECTED state. The reporting of sidelink state transitions requested by the AMF 182 may be on a per WTRU basis.

The AMF 182 may send a WTRU Sidelink State Transition Notification Request to the RAN 113 (1302). The WTRU Sidelink State Transition Notification Request message may identify the WTRU(s) for which notification(s) are requested. The WTRU Sidelink State Transition Notification Request may indicate a notification behavior of subsequent sidelink state transitions as the WTRUs move in and out of the ProSe communication range.

The RAN 113 may receive the UE Sidelink State Transition Notification Request and may configure/update a sidelink measurement configuration to include PC5 inviability information (e.g., a PC5 keep-alive timeout, etc.) as a criterion for triggering the WTRU to send a sidelink measurement report (1304). A V2X/ProSe layer may in the WTRU may inform the AS layer of the PC5 inviability information. Alternatively, the RAN 113 may configure a threshold for RRC measurements of the PC5 link quality and the WTRU may send an RRC measurement when the PC5 quality goes below the set threshold. The WTRU, while in CM-CONNECTED and RRC_CONNECTED, may send to the RAN 113 an RRC MeasurementReport message carrying the PC5 notification report (1306).

The RAN may send to the AMF 182 a WTRU sidelink state notification message that may include the PC5 notification report (1308). The WTRU Sidelink State Transition Notification Request may specify a notification behavior. For example, the WTRU sidelink state notification message may be sent as a one-off notification, if specified as the notification behavior in the UE Sidelink State Transition Notification Request. Alternatively, the WTRU sidelink state notification message may be sent every time the sidelink state changes, if specified as the notification behavior in the UE Sidelink State Transition Notification Request. The AMF 182 may send a Cancel UE Sidelink State Notification message (1310) to inform the RAN 113 that it should terminate notifications for a given WTRU.

Figure 14:
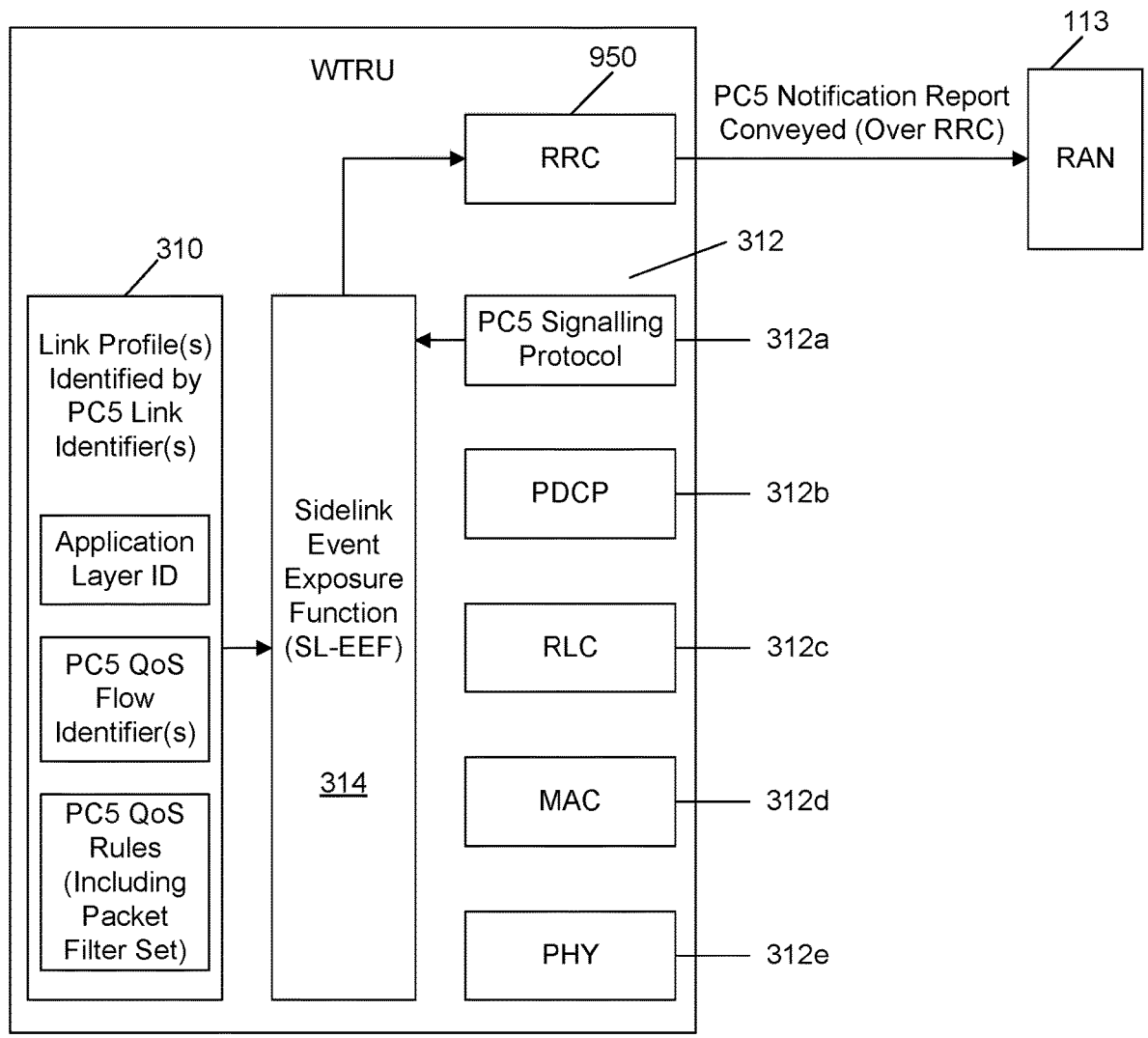
FIG. 14 is a block diagram illustrating an example WTRU architecture according to an embodiment.

FIG. 14 is a block diagram illustrating an example WTRU architecture 1400 according to an embodiment. The WTRU architecture 1400 may be suitable for generating a PC5 notification report and/or conveying a PC5 notification report to a RAN 113. The WTRU architecture 1200 is similar to WTRU architecture 900 of FIG. 9.

Figure 15:
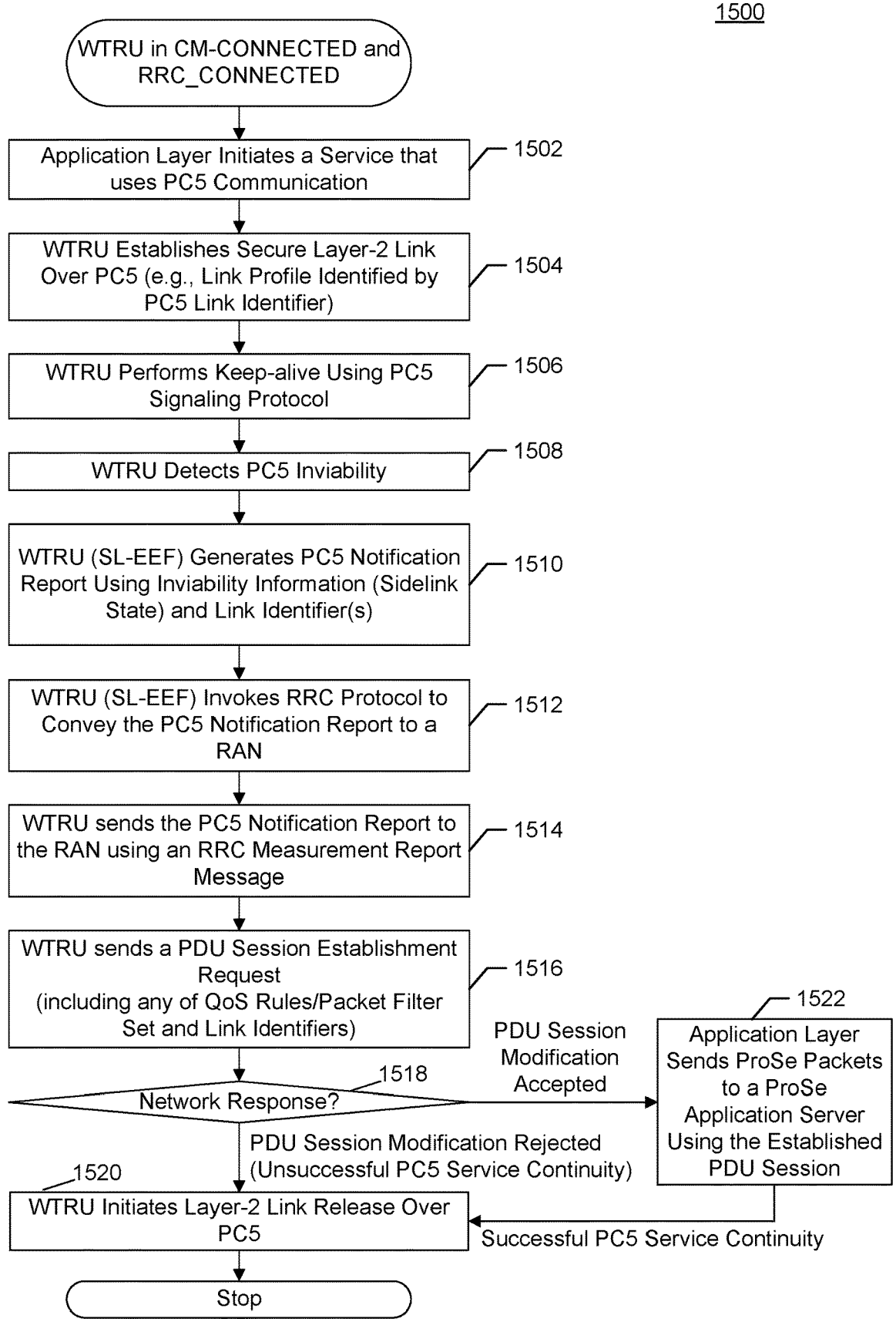
FIG. 15 is a flow chart illustrating an example flow for carrying out service continuity according to various embodiments.

FIG. 15 is a flow chart illustrating an example flow 1500 for carrying out service continuity according to various embodiments. The flow 1500 may be suitable for carrying out service continuity in which two WTRUs engaged in sidelink transmission are in connection management state CM-CONNECTED and RRC_CONNECTED with one or more active PDU sessions. For convenience and simplicity of exposition, the flow 1500 is described with reference to the WTRU architecture 1400 (FIG. 14), the PC5 unicast links (FIG. 2D) and the architecture of the communications system 100 (FIG. 1). The flow 1500 may be carried out using different architectures as well.

Further, as one of ordinary skill would recognize, some of the flow 1500 may be separately carried out by both of the two WTRUs. And as such, for convenience and simplicity of exposition in the description that follows, the nomenclature "WTRU 102a (WTRU 102b)" and "WTRU 102b (WTRU 102a)" is used to reflect the separate performance by the WTRUs. Also for convenience and simplicity of exposition in the description that follows, the nomenclature "WTRU 102a" refer to one of the two WTRUs and the terms "WTRU 102b" refer to the other WTRU.

The WTRU application layer (e.g., WTRU application 103) of the WTRU 102a may initiate a service that uses a PC5 unicast communication (1502). The WTRU 102a may establish a secure layer-2 link over the PC5 interface with the WTRU 102b (1504). In an embodiment, the WTRU 102a may send a direct communication request message to the WTRU 102b. The direct communication request message may be sent to trigger mutual authentication. The WTRU 102b may receive the direct communication request message and may initiate a procedure for mutual authentication. Successful completion of the mutual authentication procedure completes the establishment of the secure layer-2 link over PC5.

The WTRU 102a (WTRU 102b) may use the keep alive or other functionality of the PC5 signaling protocol entity 312a to maintain the layer-2 link over PC5 (1506). The WTRU 102a (WTRU 102b) may determine that the PC5 sidelink is not or no longer for communications with the WTRU 102b (WTRU 102a) using the keep alive or other functionality of the PC5 signaling protocol entity 312a (e.g., as a proxy for detecting that the WTRUs are not within proximity/ProSe communication range of each other) (1508).

The SL-EEF 314 of the WTRU 102a (WTRU 102b) may generate a PC5 notification report using PC5 inviability information and the sidelink identifiers (1510). The SL-EEF 314, for example, may concatenate or otherwise combine the PC5 inviability information and the sidelink identifiers to form the PC5 notification report.

The SL-EEF 314 may provide the PC5 notification report to RRC entity 1402 (1512). The RRC entity 902 may invoke the RRC protocol to convey the PC5 notification report to the RAN 113 (1514). In an embodiment, a V2X/ProSe layer in the WTRU may invoke the RRC protocol to convey the PC5 notification report. The RRC entity 902 may send the PC5 notification report within an RRC MeasurementReport message.

The WTRU 102a (WTRU 102b) may initiate a WTRU Requested PDU Session Modification Request and may include the QoS rules/packet filter set(s) associated with the sidelink identifier(s) (1516). The WTRU 102a (WTRU 102b) may listen to the network for a response to the WTRU Requested PDU Session Modification Request (1518). The response may be, for example, a PDU Session Modification Accept message or a PDU Session Modification Reject message (or another like-type message). If the response to the WTRU Requested PDU Session Modification Request is a PDU Session Modification Reject message, then the WTRU 102a (WTRU 102b) may proceed to initiate the layer-2 link release over PC5 (1518) and may conclude the PC5 Service continuity procedure. Under these circumstances the PC5 service continuity operation may be deemed to be unsuccessful.

Alternatively, if the response to the WTRU Requested PDU Session Modification Request is a PDU Session Modification Accept message, then the application layer may send ProSe packets to the ProSe application server using the established PDU session (1520). The WTRU 102a (WTRU 102b) may initiate a layer-2 link release over PC5 (1522) and may concludes the PC5 Service continuity procedure. Under these circumstances the PC5 service continuity operation may be deemed to be successful.

The PDU Session Establishment Request message and/or the PDU Session Modification Request message may include one or more IEs configured to carry any of the requested packet filters (QoS rules) and the requested QoS flow descriptions. The packet filters (QoS rules) associated with the sidelink identifier(s) may be carried by the PDU Session Establishment(Modification) Request message in various ways (e.g. in various IEs of the message). For example, the packet filters (QoS rules) may be carried in an extended protocol configuration options IE of the PDU Session Establishment(Modification) Request message. Alternatively, the packet filters (QoS rules) may be carried in one or more other IEs (e.g., in extensions) of the PDU Session Establishment(Modification) Request message, such as in any of a "Requested QoS rules" IE and a "Requested QoS flow descriptions" IE.

Figure 16:
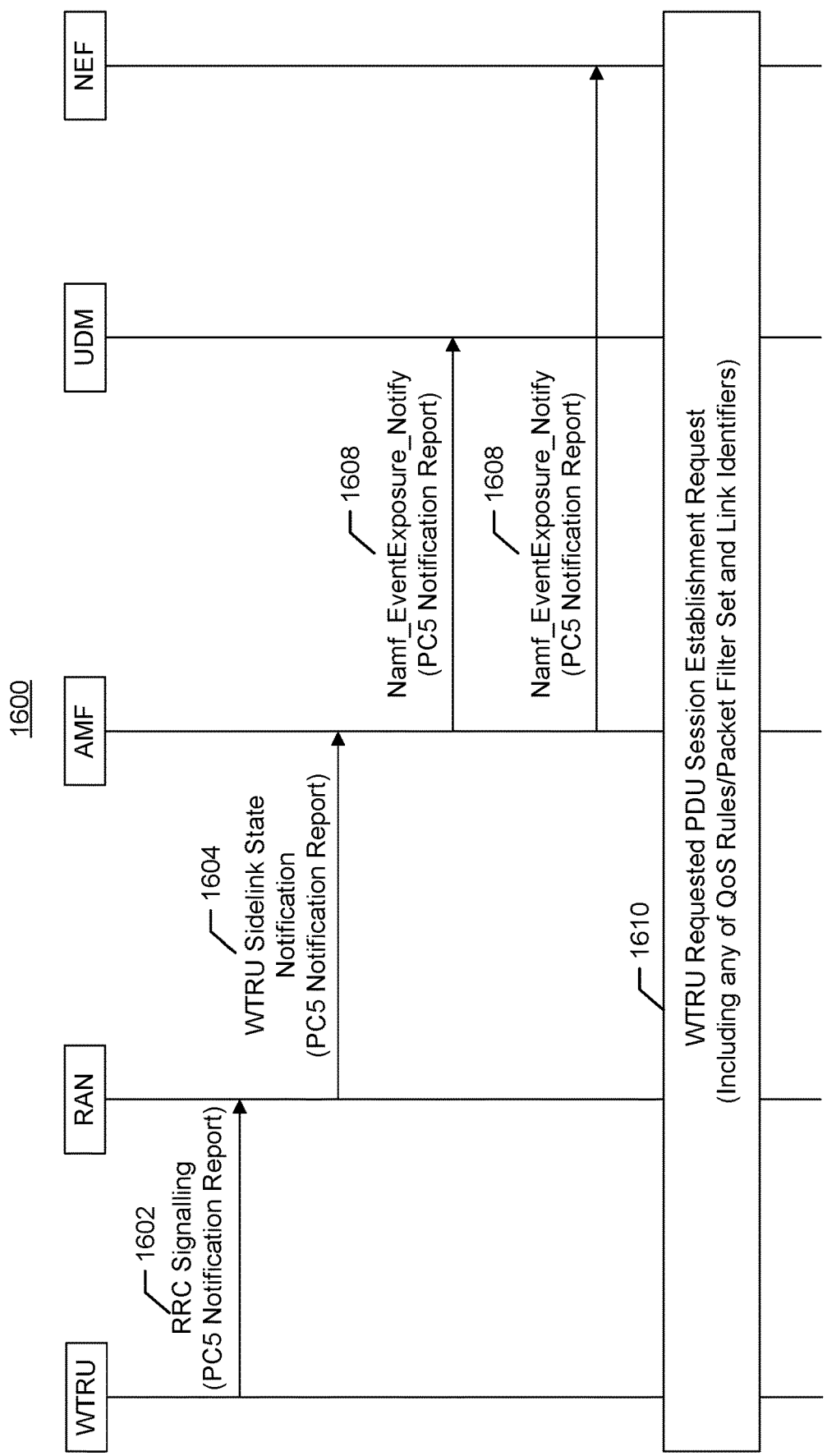
FIG. 16 illustrates a message exchange in connection with notification reporting.

FIG. 16 illustrates a message exchange 1600 in connection with PC5 notification reporting. The PC5 notification report may be conveyed to the AMF 182 via the RAN 113 using a WTRU activity notification procedure. For convenience and simplicity of exposition, the message exchange is described with reference to the WTRU architecture 1400 (FIG. 14), the PC5 unicast links (FIG. 2D) and the architecture of the communications system 100 (FIG. 1). The message exchange may be carried out using different architectures as well.

Further, the message exchange 1600 may be suitable for use with, or in connection with (e.g., to support), carrying out service continuity in connection with two WTRUs engaged in sidelink communications. As one of ordinary skill would recognize, the message exchange 1600 may be separately carried out by both of the two WTRUs along with corresponding RANs, AMFs, UDMs and NEFs. However, for convenience and simplicity of exposition, the nomenclature "WTRU", "RAN", "AMF", "UDM" and "NEF" (i.e., singular forms) are used in the description that follows.

Referring to FIG. 16, a WTRU 102, while in CM-CONNECTED and RRC_CONNECTED state, may send a PC5 notification report to the RAN 113 in an RRC MeasurementReport message (1602). The RAN 113 may receive the PC5 notification report in the RRC MeasurementReport and may send to the AMF 182 a WTRU Sidelink State Notification message that includes new PC5 notification report (1604).

A PC5 notification event may be exposed by the AMF 182 (e.g., in addition to other events exposed) using a Namf_EventExposure_service. In an embodiment, the AMF 182 may initiate a Namf_EventExposure_Notify service operation message to a UDM 191 (1606). The UDM 191 may receive the Namf_EventExposure_Notify service operation message for the WTRU 102a (506) and may trigger and/or send appropriate notifications to the NEF 187 (not shown).

Alternatively, the AMF 182 may initiate a Namf_EventExposure_Notify service operation message to (e.g., directly to) a NEF 187 (1608). The AMF 182 may do so, for example, if the UDM 191 indicates that the notification is to be sent directly to the NEF 187 and/or if the AMF 182 had been informed by the NEF 187 that the NEF 187 is to receive notifications directly from the AMF 182. The NEF 187, for example, may send a Namf_EventExposure_Subscribe service operation message to so inform the AMF 182. The WTRU may initiate a WTRU Requested PDU Session Modification Request and may include therein QoS rules/packet filter set(s) of the sidelink identifier(s).

Figure 17:
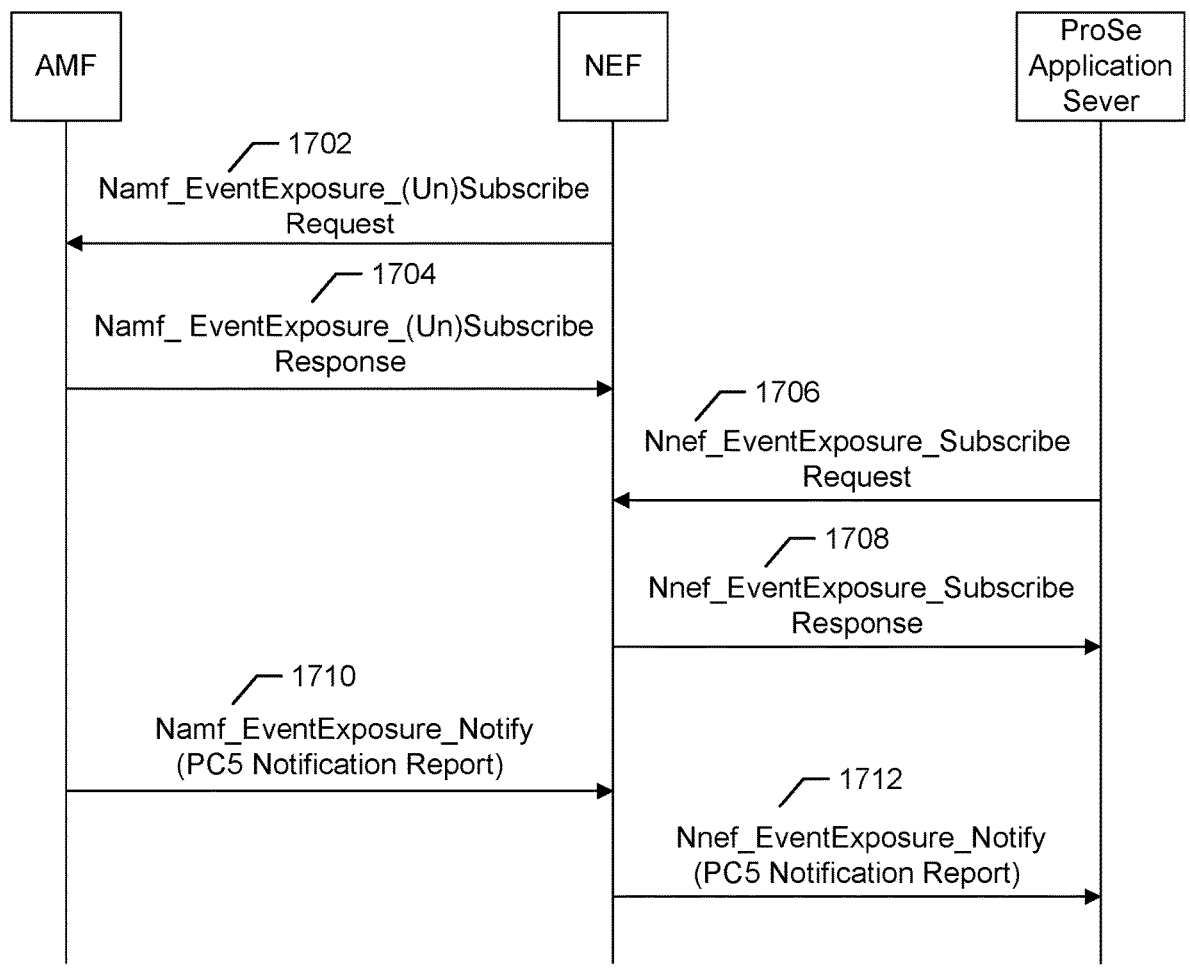
FIG. 17 illustrates a message exchange in connection with subscription and notify operations for an exposed notification event.

FIG. 17 illustrates a message exchange in connection with subscription and notify operations for an PC5 notification event. The PC5 notification event may be exposed by the AMF 182 (e.g., in addition to other events exposed by the AMF 182) using a Namf_EventExposure service. Pursuant to the message exchange, a ProSe application server 189 may subscribe to a NEF 187 to receive notifications of the PC5 notification event. For convenience and simplicity of exposition, the message exchange is described with reference to the WTRU architecture 1400 (FIG. 14), the PC5 unicast links (FIG. 2D) and the architecture of the communications system 100 (FIG. 1). The message exchange may be carried out using different architectures as well.

Further, the message exchange 1700 may be suitable for use with, or in connection with (e.g., to support), carrying out service continuity in connection with two WTRUs engaged in sidelink communications. As one of ordinary skill would recognize, some of the message exchange 170 may be separately carried out by a NEF and an AMF associated to each of the two WTRUs engaged in sidelink communications. However, for convenience and simplicity of exposition, the nomenclature "AMF" and "NEF" (i.e., singular forms) are used in the description that follows.

Referring to FIG. 17, the NEF 187 may send to the AMF a request to subscribe to a PC5 notification event (e.g., in addition to other events exposed by the AMF 182 (1702), e.g., using a Namf_EventExposure_Subscribe request. The NEF 187 may include an identification of the PC5 notification event in the Namf_EventExposure_Subscribe request. The NEF 187 may provide an associated notification endpoint of the PC5 notification event along with the request (e.g., in the Nnef_EventExposure_Subscribe request). The associated endpoint may be the NEF 187. Alternatively, the associated endpoint may be the ProSe application server 189. The AMF 182 may authorize the reporting event subscription and may record the association of the event trigger and requester identity, such as, e.g., an identifier of (associated with, assigned to, etc.) the ProSe application server 189.

The AMF 182 may acknowledge the execution of Namf_EventExposure_Subscribe (1704). The ProSe application server 189 may send a request to subscribe to a set of Event ID(s) in the NEF 187 (1706), e.g., using a Nnef_EventExposure_Subscribe request. The ProSe application server 189 may include the identification ID of the PC5 notification event in the Nnef_EventExposure_Subscribe request. The ProSe application server 189 may provide an associated notification endpoint of the PC5 notification event. The associated endpoint may be the ProSe application server 189 itself, for example. The NEF 187 may authorize the reporting event subscription and may record an association of the event trigger and requester identity, such as, e.g., an identifier of (associated with, assigned to, etc.) the ProSe application server 189.

The NEF 187 may acknowledge the execution of Nnef_EventExposure_Subscribe (1708). The AMF 182 may detect that the monitored PC5 notification event has occurred and may sends an event report (1710), e.g., using a Namf_EventExposure_Notify message, to the notification endpoint. The notification endpoint may be the NEF 187 and/or the ProSe application server 189, for example. The NEF 187 may receive the PC5 notification event report from the AMF 182 and may send the PC5 notification event report to the ProSe application server 189 (1712), e.g., using a Nnef_EventExposure_Notify message.

In an embodiment, the ProSe application server may receive a PC5 notification report from two or more of the WTRUs 102. In an embodiment, the ProSe application server 189 may receive the PC5 notification reports and may extract the respective unicast link profiles identified by the PC5 link identifier.

In an embodiment, the ProSe application server 189 may create and may maintain mappings between the two (or more) WTRUs 102 based at least in part on the unicast link profiles. The ProSe application server 189 may use a PC5 notification mapping table to create and/or maintain mappings between the two (or more) WTRUs. The PC5 notification mapping table may be Table 2 in which entries in the first two columns are populated based on (e.g., using identifiers provided in) the PC5 notification reports for two WTRUs (listed as WTRU 102a and WTRU 102b).

In an embodiment, following successful modification of a PDU session for the WTRU 102a, the ProSe application server 189 may receive ProSe packets from WTRU 102a. The ProSe application server 189 may inspect one or more the ProSe packets to identify (discover) associated WTRU application layer identifiers and routable source addresses. The ProSe application server 189 may populate the discovered source address of the WTRU 102a into the corresponding entry of the PC5 notification mapping table (e.g., Table 2), if not previously populated. The ProSe application server 189 may forward the ProSe packets to WTRU 102b if the PC5 notification mapping table (e.g., Table 2) includes an entry populated with a source address of the WTRU 102b. The ProSe application server 189 may buffer the ProSe packets if the mapping table lacks sufficient information to forward such packets. In various embodiments, the ProSe application server 189 may send to the WTRUs some or all of the mappings of the constructed mapping table to the WTRUs (e.g., the mappings corresponding to the WTRUs). The WTRUs may receive the mappings and may send subsequent ProSe packets (addressed) using the routable destination addresses.

In an embodiment, following successful PDU session establishment for the WTRU 102b, the ProSe application server 189 may receive ProSe packets from the WTRU 102b. The ProSe application server 189 may inspects one or more of the ProSe packets to identify (discover) associated WTRU application layer identifiers and routable source addresses.

The ProSe application server 189 may populate the discovered source address of the WTRU 102b into the corresponding entry of the PC5 Notification Mapping table (e.g., Table 2), if not previously populated. The ProSe application server 189 may forward the ProSe packets to the WTRU 102a if the ProSe Application Server PC5 Notification Mapping table (e.g., Table 2) includes an entry populated with the source address of the WTRU 102a. The ProSe application server 189 may buffer the ProSe packets if the mapping table lacks sufficient information to forward such packets. In various embodiments, the ProSe application server 189 may send to the WTRUs some or all of the mappings of the constructed mapping table to the WTRUs (e.g., the mappings corresponding to the WTRUs). The WTRUs may receive the mappings and may send subsequent ProSe packets (addressed) using the routable destination addresses.

FIG. 18 is a flow chart illustrating an example flow 1800 for carrying out service continuity according to various embodiments. The flow 1800 and accompanying disclosures herein may be considered a generalization of the disclosures accompanying any of (i) the flow 400 of FIG. 4, (ii) the message exchange described in connection with FIG. 5, (iii) the message exchange described in connection with FIG. 8, (iv) the flow 1000 of FIG. 10, (v) the message exchange described in connection with FIG. 11, (vi) the message exchange described in connection with FIG. 13, (vii) the flow 1500 of FIG. 15, and (vii) the message exchange described in connection with FIG. 16. The flow 1800 of may be suitable for carrying out service continuity in which two WTRUs, engaged in sidelink communications, are in any connection management state with or without active PDU sessions. For convenience and simplicity of exposition, the flow 1800 is described with reference to the WTRU architecture 200 (FIG. 2), the PC5 unicast links (FIG. 2D) and the architecture of the communications system 100 (FIG. 1). The flow 1800 may be carried out using different architectures as well.

Further, as one of ordinary skill would recognize, the flow 1800 may be separately carried out by both of the two WTRUs. However, for convenience and simplicity of exposition, the nomenclature "WTRU" (singular form) is used in the description that follows. Also for convenience and simplicity of exposition in the description that follows, the terms "WTRU 102a" refer to one of the two WTRUs and the terms "WTRU 102b" refer to the other WTRU.

Referring to FIG. 18, a WTRU 102a may determine a state of a sidelink between the WTRU 102a and the WTRU 102b (1802). The WTRU 102a may monitor for transmissions and may determine the state of the sidelink based on a number of transmissions received within a time period, e.g., using use the keep alive or other functionality of the PC5 signaling protocol entity 312a to maintain the layer-2 link over PC5. The WTRU 102a may determine the state of the sidelink to be a first value if the number of transmissions received within the time period fails to satisfy a threshold (e.g., is less than 1 transmission) and/or may determine the state of the sidelink to be a second value if the number of transmissions received within the time period satisfies the threshold (e.g., is greater than or equal to 1 transmission). Alternatively, the WTRU 102a may determine the state of the sidelink to be the first value if the number of transmissions received within the time period fails to satisfy a first threshold (e.g., is less than 2 transmissions), and may determine the state to be the second value if the number of transmissions received within the time period satisfies a second threshold (e.g., is greater than or equal to 5 transmissions). The WTRU 102a may determine the state of the sidelink to be a third value if the number of transmissions received within the time period satisfies the first threshold and fails to satisfy the second threshold. Alternatively, the WTRU 102a may leave the state of the sidelink unchanged if the number of transmissions received within the time period satisfies the first threshold and fails to satisfy the second threshold. In various embodiments, the first value may indicates that the sidelink is not or no longer viable for communications with the WTRU 102b. In various embodiments, the first value may be indicative of the first and second WTRUs not being within communication range of each other.

The WTRU 102a may transmit first information indicating the state of the sidelink and first and second identifiers associated to the WTRU 102a and the WTRU 102b to a first network element of a core network from which at least the first and second identifiers are conveyed to an application server (1804). The first network element may be, for example, an AMF or an SMF. The first identifier may be, for example, any of an application layer identifier of the WTRU 102a and a layer-2 identifier of the WTRU 102a. The second identifier may be, for example, any of an application layer identifier of the WTRU 102b and a layer-2 identifier of the WTRU 102b. The WTRU 102a may (i) obtain the first and second identifiers from a link profile of the sidelink, (ii) generate the first information indicating the state of the sidelink and first and second identifiers based on (e.g., a combination of) the state of the sidelink and the first and second identifiers obtained from the link profile, and (iii) transmit the first information as, or in, a notification report (e.g., a PC5 notification report). In accordance with the disclosures herein, the WTRU 102a may transmit the notification report in any of a NAS message and RRC message (e.g., in one or more IEs and/or containers thereof). The first and second identifiers and/or the state of the sidelink, if provided to the application server, may be used by the application server to generate a mapping between the WTRU 102a and the WTRU 102b, e.g., between the first and second identifiers and respective routable addresses of the WTRU 102a and the WTRU 102b.

The WTRU 102a may transmit, to a second network element of the core network, second information indicating a description of a traffic flow associated with the sidelink and a request to establish or modify a PDU session (1806). The second network element may be, for example, an SMF. The description of a traffic flow ("traffic-flow description") may be information (e.g., a collection of information) from which both of the WTRU 102a and the WTRU 102b can identify and/or transmit traffic of the traffic flow. The traffic-flow description may include, for example, any of a PFI and one or more QoS rules (such as a packet filter set). The WTRU 102a may obtain the PFI and QoS rules (e.g., packet filter set) from the link profile of the sidelink. The traffic-flow description may be used by the second network element to establish a PDU session or modify an existing PDU session.

The WTRU 102a may transmit outbound traffic of the traffic flow and an address of the WTRU 102a (e.g., an IP address) to the application server pursuant to the PDU session (1808). The application server may use the address of the WTRU 102a to further develop and/or revise (collectively "update") the mapping between the WTRUs 102a, 102b, and may use the address of the WTRU 102a to forward traffic of the traffic flow received from the WTRU 102b. The WTRU 102a may receive inbound traffic of the traffic flow from the application server pursuant to the PDU session (1810).

In various embodiments, e.g., as options for the flow 1800, the WTRU 102a may receive an address of the WTRU 102b from the application server (not shown), and/or may transmit outbound traffic of the traffic flow using the address of the WTRU 102. In various embodiments, e.g., as an option for the flow 1800, the WTRU 102a may receive, from the second network element of the core network, information to trigger a request to modify the PDU session or to establish another PDU session.

FIG. 19 is a flow chart illustrating an example flow 1900 for carrying out service continuity according to various embodiments. The flow 1900 and accompanying disclosures herein may be considered a generalization of the disclosures accompanying any of (i) the flow 400 of FIG. 4, (ii) the message exchange described in connection with FIG. 5, (iii) the message exchange described in connection with FIG. 8, (iv) the flow 1000 of FIG. 10, (v) the message exchange described in connection with FIG. 11, (vi) the message exchange described in connection with FIG. 13, (vii) the flow 1500 of FIG. 15, and (vii) the message exchange described in connection with FIG. 16. The flow 1900 of may be suitable for carrying out service continuity in which two WTRUs, engaged in sidelink communications, are in any connection management state with or without active PDU sessions. For convenience and simplicity of exposition, the flow 1900 is described with reference to the WTRU architecture 200 (FIG. 2), the PC5 unicast links (FIG. 2D) and the architecture of the communications system 100 (FIG. 1). The flow 1900 may be carried out using different architectures as well.

Further, as one of ordinary skill would recognize, the flow 1900 may be separately carried out by both of the two WTRUs. However, for convenience and simplicity of exposition, the nomenclature "WTRU" (singular form) is used in the description that follows. Also for convenience and simplicity of exposition in the description that follows, the terms "WTRU 102a" refer to one of the two WTRUs and the terms "WTRU 102b" refer to the other WTRU.

The flow 1900 is similar to flow 1800 of FIG. 18, except as follows. Instead of carrying out parts (1804) and (1806), the WTRU 102a may transmit first information indicating the state of the sidelink, a traffic-flow description associated with the sidelink and first and second identifiers associated to the WTRUs 102a, 102b to a network element of a core network from which at least the description of the traffic flow and the first and second identifiers are conveyed to an application server (1903). The network element may be, for example, an SMF. The first identifier may be any of an application layer identifier of the WTRU 102a and a layer-2 identifier of the WTRU 102a, and the second identifier may be any of an application layer identifier of the WTRU 102b and a layer-2 identifier of the WTRU 102b. The WTRU 102a may (i) obtain the first and second identifiers and any of a PCI and one or more QoS rules from a link profile of the sidelink, (ii) generate the first information indicating the state of the sidelink, traffic-flow description and first and second identifiers based on (e.g., a combination of) the state of the sidelink along with the obtained first and second identifiers, the PCI and/or QoS rules, and (iv) transmit first information as, or in, a notification report (e.g., a PC5 notification report). In accordance with the disclosures herein, the WTRU 102a may transmit the notification report in any of a NAS message and RRC message (e.g., in one or more IEs and/or containers thereof).

The first and second identifiers and/or the state of the sidelink, if provided to the application server, may be used by the application server to generate a mapping between the WTRU 102a and the WTRU 102b, e.g., between the first and second identifiers and respective routable addresses of the WTRU 102a and the WTRU 102b. The traffic-flow description may be used by the second network element to establish a PDU session or modify an existing PDU session through which the WTRU may transmit the outbound traffic and/or receive the inbound traffic.

In various embodiments, e.g., as options to the flow 1900, the WTRU 102a may receive an address of the WTRU 102b from the application server (not shown), and/or may transmit outbound traffic of the traffic flow using the address of the WTRU 102, e.g., through the PDU session, a modified PDU session, and/or a newly established PDU session. In various embodiments, e.g., as an option to the flow 1900, the WTRU 102a may receive, from the second network element of the core network, information to trigger a request to modify the PDU session or establish another PDU session (through which the WTRU 102 may transmit outbound traffic using the address of the WTRU 102b and/or receive inbound traffic).

FIG. 20 is a flow chart illustrating an example flow 2000 for carrying out service continuity according to various embodiments. The flow 2000 and accompanying disclosures herein may be considered a generalization of the disclosures accompanying any of (i) the flow 400 of FIG. 4, (ii) the message exchange described in connection with FIG. 5, (iii) the message exchange described in connection with FIG. 8, (iv) the flow 1000 of FIG. 10, (v) the message exchange described in connection with FIG. 11, (vi) the message exchange described in connection with FIG. 13, (vii) the flow 1500 of FIG. 15, and (vii) the message exchange described in connection with FIG. 16. The flow 2000 of may be suitable for carrying out service continuity in which two WTRUs, engaged in sidelink communications, are in any connection management state with or without active PDU sessions. For convenience and simplicity of exposition, the flow 2000 is described with reference to the WTRU architecture 200 (FIG. 2), the PC5 unicast links (FIG. 2D) and the architecture of the communications system 100 (FIG. 1). The flow 2000 may be carried out using different architectures as well.

Further, as one of ordinary skill would recognize, the flow 2000 may be separately carried out by both of the two WTRUs. However, for convenience and simplicity of exposition, the nomenclature "WTRU" (singular form) is used in the description that follows. Also for convenience and simplicity of exposition in the description that follows, the terms "WTRU 102a" refer to one of the two WTRUs and the terms "WTRU 102b" refer to the other WTRU.

Referring to FIG. 20, the WTRU 102a may determine a state of a sidelink between the WTRU 102a and the WTRU 102b (2002), e.g., as disclosed herein in connection with flow 1800 of FIG. 18. The WTRU 102a may transmit information indicating the state of the sidelink, a description of a traffic flow associated with the sidelink and first and second identifiers associated to the WTRUs 102a, 102b to a network element of a core network from which at least the description of the traffic flow and the first and second identifiers are conveyed to an application server (2003). The network function may be, for example, an SMF. The first identifier may be any of an application layer identifier of the WTRU 102a and a layer-2 identifier of the WTRU 102a, and the second identifier may be any of an application layer identifier of the WTRU 102b and a layer-2 identifier of the WTRU 102b. The WTRU 102a may (i) obtain the first and second identifiers and any of a PCI and one or more QoS rules from a link profile of the sidelink, (ii) generate the first information indicating the state of the sidelink, traffic-flow description and first and second identifiers based on (e.g., a combination of) the state of the sidelink along with the obtained first and second identifiers, the PCI and/or QoS rules, and (iv) transmit first information as, or in, a notification report (e.g., a PC5 notification report). In accordance with the disclosures herein, the WTRU 102a may transmit the notification report in any of a NAS message and RRC message (e.g., in one or more IEs and/or containers thereof). The first and second identifiers and/or the state of the sidelink, if provided to the application server, may be used by the application server to generate a mapping between the WTRU 102a and the WTRU 102b, e.g., between the first and second identifiers and respective routable addresses of the WTRU 102a and the WTRU 102b.

The WTRU 102a may receive, from the application server, information to trigger the WTRU to request to establish or modify a PDU session (2005). The information may be, for example, an indication that the WTRU 102b might be going out of range and/or a quality of the sidelink is worsening. The indication may be based on a value of the state of the sidelink (or a value of a state of the side like provided from the WTRU 102b).

The WTRU 102a may transmit second information indicating a request to establish or modify a PDU session (2007). The second information may also indicate a traffic-flow description associated with the sidelink. The traffic-flow description may be used by the second network element to establish a PDU session or modify an existing PDU session through which the WTRU may transmit the outbound traffic and/or receive the inbound traffic.

The WTRU 102a may transmit outbound traffic of the traffic flow and an address of the WTRU 102a (e.g., an IP address) to the application server pursuant to the PDU session (2008). The application server may use the address of the WTRU 102a to update the mapping between the WTRUs 102a, 102b, and may use the address of the WTRU 102a to forward traffic of the traffic flow received from the WTRU 102b. The WTRU 102a may receive inbound traffic of the traffic flow from the application server pursuant to the PDU session (2010).

In various embodiments, e.g., as options to the flow 2000, the WTRU 102a may receive an address of the WTRU 102b from the application server (not shown), and/or may transmit outbound traffic of the traffic flow using the address of the WTRU 102, e.g., through the PDU session, a modified PDU session, and/or a newly established PDU session. In various embodiments, e.g., as an option to the flow 2000, the WTRU 102a may receive, from the second network element of the core network, information to trigger a request to modify the PDU session or establish another PDU session (through which the WTRU 102 may transmit outbound traffic using the address of the WTRU 102b and/or receive inbound traffic).

FIG. 21 is a flow chart illustrating an example flow 2100 for carrying out service continuity according to various embodiments. The flow 2100 and accompanying disclosures herein may be considered a generalization of the disclosures accompanying any of (i) the flow 400 of FIG. 4, (ii) the message exchange described in connection with FIG. 5, (iii) the message exchange described in connection with FIG. 8, (iv) the flow 1000 of FIG. 10, (v) the message exchange described in connection with FIG. 11, (vi) the message exchange described in connection with FIG. 13, (vii) the flow 1500 of FIG. 15, and (vii) the message exchange described in connection with FIG. 16. The flow 2100 of may be suitable for carrying out service continuity in which two WTRUs, engaged in sidelink communications, are in any connection management state with or without active PDU sessions. For convenience and simplicity of exposition, the flow 2100 is described with reference to the WTRU architecture 200 (FIG. 2), the PC5 unicast links (FIG. 2D) and the architecture of the communications system 100 (FIG. 1). The flow 2100 may be carried out using different architectures as well.

Further, as one of ordinary skill would recognize, the flow 2100 may be separately carried out by both of the two WTRUs. However, for convenience and simplicity of exposition, the nomenclature "WTRU" (singular form) is used in the description that follows. Also for convenience and simplicity of exposition in the description that follows, the terms "WTRU 102a" refer to one of the two WTRUs and the terms "WTRU 102b" refer to the other WTRU.

The flow 2100 is similar to flow 2000 of FIG. 20, except that flow 2100 may include the parts (2104) and (2105) instead of parts (2003) and (2005) of the flow 2000. Referring to FIG. 21, the WTRU 102a may determine a state of a sidelink between the WTRU 102a and the WTRU 102b (2102), e.g., as disclosed herein in connection with flow 1800 of FIG. 18.

The WTRU 102a may transmit first information indicating the state of the sidelink and first and second identifiers associated to the WTRU 102a and the WTRU 102b to a first network element of a core network from which at least the first and second identifiers are conveyed to an application server (2104). The first network element may be, for example, an AMF or an SMF. The first identifier may be any of an application layer identifier of the WTRU 102a and a layer-2 identifier of the WTRU 102a. The second identifier may be any of an application layer identifier of the WTRU 102b and a layer-2 identifier of the WTRU 102b. The WTRU 102a may (i) obtain the first and second identifiers from a link profile of the sidelink, (ii) generate the first information indicating the state of the sidelink and first and second identifiers based on (e.g., a combination of) the state of the sidelink and the first and second identifiers obtained from the link profile, and (iii) transmit the first information as, or in, a notification report (e.g., a PC5 notification report). In accordance with the disclosures herein, the WTRU 102a may transmit the notification report in any of a NAS message and RRC message (e.g., in one or more IEs and/or containers thereof). The first and second identifiers and/or the state of the sidelink, if provided to the application server, may be used by the application server to generate a mapping between the WTRU 102a and the WTRU 102b, e.g., between the first and second identifiers and respective routable addresses of the WTRU 102a and the WTRU 102b.

The WTRU 102a may receive, from a second network element of the core network, information to trigger a request to establish or modify a PDU session (2105). The second network element may be an SMF, for example. Parts (2107), (2108) and (2110) may be carried out, e.g., as disclosed herein in connection parts (2007), (2008) and (2010) with flow 2007 of FIG. 20.

In various embodiments, e.g., as options to the flow 2100, the WTRU 102a may receive an address of the WTRU 102b from the application server (not shown), and/or may transmit outbound traffic of the traffic flow using the address of the WTRU 102, e.g., through the PDU session, a modified PDU session, and/or a newly established PDU session. In various embodiments, e.g., as an option to the flow 2100, the WTRU 102a may receive, from the second network element of the core network, information to trigger a request to modify the PDU session or establish another PDU session (through which the WTRU 102 may transmit outbound traffic using the address of the WTRU 102b and/or receive inbound traffic).

FIG. 22 is a flow chart illustrating an example flow 2200 for carrying out service continuity according to various embodiments. The flow 2200 and accompanying disclosures herein may be considered a generalization of the disclosures accompanying any of (i) the flow 400 of FIG. 4, (ii) the message exchange described in connection with FIG. 5, (iii) the message exchange described in connection with FIG. 7, (iv) the message exchange described in connection with FIG. 8, (v) the flow 1000 of FIG. 10, (vi) the message exchange described in connection with FIG. 11, (vii) the message exchange described in connection with FIG. 12, (viii) the message exchange described in connection with FIG. 13, (ix) the flow 1500 of FIG. 15, (x) the message exchange described in connection with FIG. 16, and (xi) the message exchange described in connection with FIG. 17.

The flow 2200 of may be suitable for carrying out service continuity in which two WTRUs, engaged in sidelink communications, are in any connection management state with or without active PDU sessions. For convenience and simplicity of exposition, the flow 2200 is described with reference to the WTRU architecture 200 (FIG. 2), the PC5 unicast links (FIG. 2D) and the architecture of the communications system 100 (FIG. 1). The flow 2200 may be carried out using different architectures as well.

Referring to FIG. 22, an application server may receive (i) first information indicating a first state of a sidelink between WTRU 102*a* and WTRU 102*b*, a traffic-flow description associated with the sidelink and first and second identifiers associated to the WTRU 102*a* and WTRU 102*b*, and (ii) second information indicating a second state of the sidelink, the traffic-flow description and third and fourth identifiers associated to the WTRU 102*a* and WTRU 102*b* (2220). The first information may have originated from the WTRU 102*a* and the second information may have originated from the WTRU 102*b*. The application server may receive the first information and the second information from one or more network elements of one or more core networks. The network elements may be, for example, an AMF associated with the WTRU 102*a* and the WTRU 102*b* or an SMF associated with the WTRU 102*a* and the WTRU 102*b*. Alternatively, the network elements may be, for example, a first AMF associated with the WTRU 102*a* and a second AMF associated with the WTRU 102*b*. The application server may receive the first information and the second information as, or in, respective link notification reports (e.g., PC5 notification reports). In accordance with the disclosures herein, the one or more network elements may transmit the notification reports to the application server in any of a NAS message and RRC message (e.g., in one or more IEs and/or containers thereof).

The first and second identifiers and/or the state of the sidelink may be used by the application server to generate a mapping between the WTRU 102*a* and the WTRU 102*b*, e.g., between the first and second identifiers and respective routable addresses of the WTRU 102*a* and the WTRU 102*b*. The traffic-flow description may be sent to and used by the network elements to establish PDU sessions or modify existing PDU sessions through which the WTRU 102*a* and the WTRU 102*b* may transmit outbound traffic of the traffic flow and/or receive inbound traffic of the traffic flow.

The application server may receive, from the WTRU 102*a*, first traffic of the traffic flow associated with the sidelink and an address of the WTRU 102*a* (2222). The application server may receive, from the WTRU 102*b*, second traffic of the traffic flow associated with the sidelink and an address of the WTRU 102*b* (2224). The application server may use the addresses of the WTRU 102*a* and the WTRU 102*b* to update the mapping between the WTRUs 102*a*, 102*b*. The application server may transmit the second traffic of the traffic flow using the address of the WTRU 102*a* (2226). The application server may transmit the first traffic of the traffic flow using the address of the WTRU 102*b*.

In various embodiments, e.g., as an option to the flow 2200, the application server may receive the first information from a first network element of the one or more network elements pursuant to a first subscription with the first network element to receive the first information responsive to a first event. In various embodiments, e.g., as an option to the flow 2200, the application server may receive the second information from a second network element of the one or more network elements pursuant to a second subscription with the second network element to receive the second information responsive to a second event. In various embodiments, the first event may be when the first state indicates the sidelink is not or no longer viable for communications with the WTRU 102*b*, and the second event may be when the second state indicates the sidelink is not or no longer viable for communications with the WTRU 102*a*.

In various embodiments, e.g., as options to the flow 2200, the application server may (i) transmit the address of the WTRU 102*b* to the WTRU 102*a*, and/or (ii) transmit the address of the WTRU 102*a* to the WTRU 102*b*, e.g., through the PDU sessions, modified PDU sessions, and/or a newly established PDU sessions. In various embodiments, e.g., as options to the flow 2200, the application server may transmit third information to trigger the WTRU 102*a* to modify the PDU session or establish another PDU session (through which the WTRU 102*a* may transmit outbound traffic using the address of the WTRU 102*b* and/or receive inbound traffic). In various embodiments, e.g., as options to the flow 2200, the application server may transmit fourth information to trigger the WTRU 102*b* to modify the PDU session or establish another PDU session (through which the WTRU 102*b* may transmit outbound traffic using the address of the WTRU 102*a* and/or receive inbound traffic).

FIG. 23 is a flow chart illustrating an example flow 2300 for carrying out service continuity according to various embodiments. The flow 2300 and accompanying disclosures herein may be considered a generalization of the disclosures accompanying any of (i) the flow 400 of FIG. 4, (ii) the message exchange described in connection with FIG. 5, (iii) the message exchange described in connection with FIG. 7, (iv) the message exchange described in connection with FIG. 8, (v) the flow 1000 of FIG. 10, (vi) the message exchange described in connection with FIG. 11, (vii) the message exchange described in connection with FIG. 12, (viii) the message exchange described in connection with FIG. 13, (ix) the flow 1500 of FIG. 15, (x) the message exchange described in connection with FIG. 16, and (xi) the message exchange described in connection with FIG. 17.

The flow 2300 of may be suitable for carrying out service continuity in which two WTRUs, engaged in sidelink communications, are in any connection management state with or without active PDU sessions. For convenience and simplicity of exposition, the flow 2300 is described with reference to the WTRU architecture 200 (FIG. 2), the PC5 unicast links (FIG. 2D) and the architecture of the communications system 100 (FIG. 1). The flow 2300 may be carried out using different architectures as well. The flow 2300 is similar to the flow 2200 of FIG. 22, except that the first information and second information received by the application server lack the first and second states of the link (2321). The first and second states of the link might not be provided as such may be inferred from the reporting event and/or the notification report.

Figure 24:
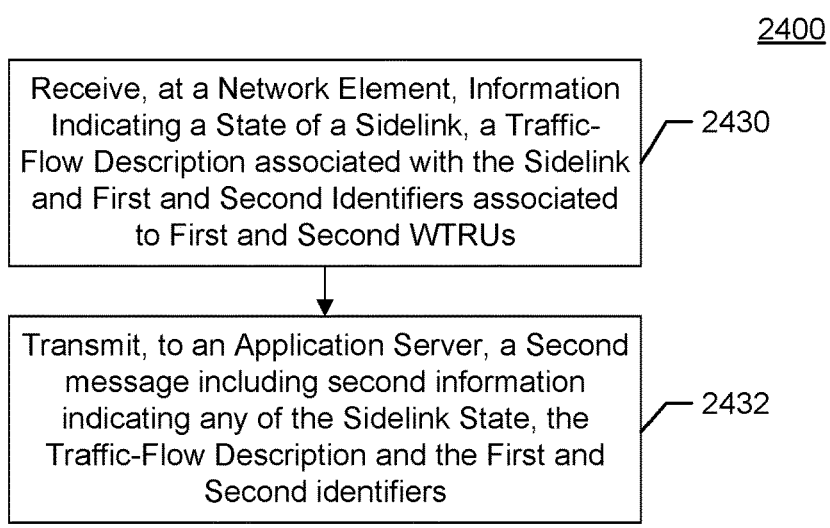

FIG. 24 is a flow chart illustrating an example flow 2400 for carrying out service continuity according to various embodiments. The flow 2400 and accompanying disclosures herein may be considered a generalization of the disclosures accompanying any of (i) the flow 400 of FIG. 4, (ii) the message exchange described in connection with FIG. 5, (iii) the message exchange described in connection with FIG. 7, (iv) the message exchange described in connection with FIG. 8, (v) the flow 1000 of FIG. 10, (vi) the message exchange described in connection with FIG. 11, (vii) the message exchange described in connection with FIG. 12, (viii) the message exchange described in connection with FIG. 13, (ix) the flow 1500 of FIG. 15, (x) the message exchange described in connection with FIG. 16, and (xi) the message exchange described in connection with FIG. 17.

The flow 2400 of may be suitable for carrying out service continuity in which two WTRUs, engaged in sidelink communications, are in any connection management state with or without active PDU sessions. For convenience and simplicity of exposition, the flow 2400 is described with reference to the WTRU architecture 200 (FIG. 2), the PC5 unicast links (FIG. 2D) and the architecture of the communications system 100 (FIG. 1). The flow 2400 may be carried out using different architectures as well.

Further, as one of ordinary skill would recognize, the flow 2400 may be separately carried out by both of the two WTRUs. However, for convenience and simplicity of exposition the nomenclature "WTRU" (singular form) is used in the description that follows. Also for convenience and simplicity of exposition in the description that follows, the terms "WTRU 102a" refer to one of the two WTRUs and the terms "WTRU 102b" refer to the other WTRU.

Referring to FIG. 24, a network element of a core network (e.g., an AMF or an SMF) may receive, from the WTRU 102b, a first message including information indicating a state of a sidelink between the WTRU 102a and a WTRU 102b, a traffic-flow description associated with the sidelink and first and second identifiers associated to the WTRU 102a and the WTRU 102b (2430). The first message may be a NAS message or an RRC message, for example The network element may transmit, to an application server, a second message including second information indicating at least the first and second identifiers (2432). The second message may be an RRC message. The network element may transmit the second message to the application server, e.g., pursuant to a subscription to provide the second information responsive to an event. In various embodiments, the event is when the state indicates the sidelink is not or no longer viable for communications with the second WTRU.

INCORPORATED HEREIN BY REFERENCE ARE

[1] 3GPP TS 23.501 V16.2.0
[2] 3GPP TS 23.287 V16.0.0
[3] 3GPP TS 23.303 V15.1.0
[4] 3GPP TS 36.300
[5] 3GPP TS 24.334
[6] 3GPP TS 23.502 V16.2.0
[7] 3GPP TS 24.501 V16.2.0

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A method implemented in a first wireless transmit/receive unit, WTRU, the method comprising:
   determining a state of sidelink communications between the first WTRU and a second WTRU;
   transmitting first information to a first network element of a core network, wherein the first information indicates the state of the sidelink communications, a first identifier associated with the first WTRU and a second identifier associated with the second WTRU for sidelink communications;
   transmitting second information to a second network element of the core network, wherein the second information indicates a description of a traffic flow associated with the sidelink communications and a request to establish a protocol data unit session;
   transmitting outbound traffic of the traffic flow associated with the sidelink communications and an address of the first WTRU to an application server pursuant to the protocol data unit session; and
   receiving inbound traffic of the traffic flow associated with the sidelink communications from the application server pursuant to the protocol data unit session.

2. The method of claim 1, wherein determining a state of sidelink communications between the first WTRU and the second WTRU comprises:
   monitoring for keep alive transmissions; and
   determining the state of the sidelink communications based on a number of keep alive transmissions received within a time period.

3. The method of the claim 2, wherein the state is a first value if the number of keep alive transmissions received within the time period fails to satisfy a first threshold, and wherein the state is a second value if the number of keep alive transmissions received within the time period satisfies one of the first threshold and a second threshold different from the first threshold.

4. The method of claim 3, wherein the first value indicates the sidelink communications with the second WTRU are not or no longer viable.

5. The method of claim 1, further comprising:
receiving an address of the second WTRU from the application server; and
transmitting outbound traffic of the traffic flow associated with the sidelink communications using the address of the second WTRU.

6. The method of claim 1, wherein at least one of:
the first and second network elements comprise an access and mobility management function and a session management function, respectively;
the first and second network elements are the same network element; and
each of the first and second network elements comprises one of a session management function and an access and mobility management function.

7. The method of claim 1, wherein the first identifier comprises any of an application layer identifier of the first WTRU and a layer-2 identifier of first the WTRU, and wherein the second identifier comprises any of an application layer identifier of the second WTRU and a layer-2 identifier of the second WTRU.

8. The method claim 1, wherein the description of a traffic flow associated with the sidelink communications comprises any of a PC5 quality of service flow identifier and one or more quality of service rules.

9. The method of claim 1, wherein at least one of:
the first information is transmitted as, or in, in a notification message; and
the first information is transmitted as, or in, any of a non-access stratum message and a radio resource control message.

10. The method of claim 1, further comprising:
receiving, from the second network element of the core network, information to trigger the WTRU to request to establish the protocol data unit session.

11. A first wireless transmit/receive unit, WTRU, comprising circuitry, including a transmitter, receiver, a processor and memory, configured to:
determine a state of sidelink communications between the first WTRU and a second WTRU;
transmit first information to a first network element of a core network, wherein the first information indicates the state of the sidelink communications, a first identifier associated with the first WTRU and a second identifier associated with the second WTRU for sidelink communications;
transmit second information to a second network element of the core network, wherein the second information indicates a description of a traffic flow associated with the sidelink communications and a request to establish a protocol data unit session;
transmit outbound traffic of the traffic flow associated with the sidelink communications and an address of the first WTRU to the application server pursuant to the protocol data unit session; and
receive inbound traffic of the traffic flow associated with the sidelink from the application server pursuant to the protocol data unit session.

12. The first WTRU of claim 11, wherein the circuitry is configured to:
monitor for keep alive transmissions; and
determine the state of the sidelink communications based on a number of keep alive transmissions received within a time period.

13. The first WTRU of claim 11, wherein the circuitry is configured to:
receive an address of the second WTRU from the application server; and
transmit outbound traffic of the traffic flow associated with the sidelink communications using the address of the second WTRU.

14. The first WTRU of claim 11, wherein the state is a first value if the number of keep alive transmissions received within the time period fails to satisfy a first threshold, and wherein the state is a second value if the number of keep alive transmissions received within the time period satisfies one of the first threshold and a second threshold different from the first threshold.

15. The first WTRU of claim 14, wherein the first value indicates the sidelink communications with the second WTRU are not or no longer viable.

16. The first WTRU of claim 11, wherein at least one of:
the first and second network elements comprise an access and mobility management function and a session management function, respectively;
the first and second network elements are the same network element; and
each of the first and second network elements comprises one of a session management function and an access and mobility management function.

17. The first WTRU of claim 11, wherein the first identifier comprises any of an application layer identifier of the first WTRU and a layer-2 identifier of first the WTRU, and wherein the second identifier comprises any of an application layer identifier of the second WTRU and a layer-2 identifier of the second WTRU.

18. The first WTRU of claim 11, wherein the description of a traffic flow associated with the sidelink communications comprises any of a PC5 quality of service flow identifier and one or more quality of service rules.

19. The first WTRU of claim 11, wherein at least one of:
the first information is transmitted as, or in, a notification message; and
the first information is transmitted as, or in, any of a non-access stratum message and a radio resource control message.

20. The first WTRU of claim 11, wherein the circuitry is configured to:
receive, from the second network element of the core network, information to trigger the WTRU to request to establish the protocol data unit session.

* * * * *